United States Patent [19]

Kageyama et al.

[11] Patent Number: 5,142,353
[45] Date of Patent: Aug. 25, 1992

[54] TELEVISION SIGNAL PROCESSING APPARATUS

[75] Inventors: Sadashi Kageyama, Hirakata; Yoshio Abe, Ibaraki; Yoshio Yasumoto, Nara; Shuji Inoue; Hideyo Uwabata, both of Neyagawa, all of Japan

[73] Assignee: Matsushita Electric Industrial Co., Ltd., Osaka, Japan

[21] Appl. No.: 685,164

[22] Filed: Apr. 12, 1991

Related U.S. Application Data

[62] Division of Ser. No. 285,526, Dec. 16, 1988, abandoned.

[30] Foreign Application Priority Data

Dec. 23, 1987 [JP] Japan .................................. 62-325869
Dec. 23, 1987 [JP] Japan .................................. 62-325871

[51] Int. Cl.$^5$ ........................................... H04N 11/00
[52] U.S. Cl. ........................................... 358/12
[58] Field of Search .............................. 358/12

[56] References Cited

U.S. PATENT DOCUMENTS

| | | | |
|---|---|---|---|
| 4,551,754 | 11/1985 | Meise et al. | 358/180 |
| 4,839,720 | 6/1989 | Isnardi | 358/12 |
| 4,855,824 | 8/1989 | Fuhrer | 358/12 |
| 4,884,127 | 11/1989 | Isnardi et al. | 358/12 |

FOREIGN PATENT DOCUMENTS 60-213185 10/1985 Japan .
206992 9/1987 Japan .

OTHER PUBLICATIONS

Yasumoto et al., An Extended Television System Using Quadrature Modulation of the Video Carrier with Inverse Nyquist Filter, IEEE Transactions on Consumer Electronics, vol. CE-33, No. 3, Aug. 1987, pp. 173-180.
Isnardi et al., A Single Channel NTSC Compatible Widescreen EDTV System, HDTV Colloquium Ottawa Canada 4-8 Oct. 1987.
Yasumoto et al., A Fully Compatible Extended Definition Television System Capable of Increasing the Aspect Ratio, 16th BTA 24 Feb. 1987.
"Encoding for Compatibility and Recoverability in the ACTV System", Isnardi et al.: IEEE Transactions on Broadcasting, vol. BC-33, No. 4, Dec. 1987, pp. 116-123.
"Decoding Issues in the ACTV System", Isnardi et al.; IEEE Transactions on Consumer Electronics, vol. 34, No. 1, Feb. 1988, pp. 111-120.

*Primary Examiner*—John W. Shepperd
*Attorney, Agent, or Firm*—Wenderoth, Lind & Ponack

[57] ABSTRACT

A television signal processor which is compatible with the existing television systems and is capable of producing television signals having a larger aspect ratio than the standard aspect ratio has an arrangement such that, at the transmission side, a main signal and a multiplex signal are produced from an electrical signal obtained by receiving an original image through processes such as time-axis compression, time-axis expansion, and chrominance signal processing, and are subjected to non-time-axis multiplexing. The processor has a further arrangement such that, at the reception side, there are provided a circuit for separating the non-time-axis multiplexed signal, a circuit for separating a luminance signal and a chrominance signal, a circuit for demodulating the chrominance signal, a circuit for effecting time-axis compression, a circuit for time-axis expanding the time-axis multiplexed signal, and a circuit for time-axis compressing the non-time-axis multiplexed signal. A receiver provided with this processor may receive images broadcast under the existing television systems without troubles and also may reproduce TV images with a larger aspect ratio than the conventional 4:3 aspect ratio by the application of synchronous detection, time-axis compression, time-axis expansion, etc.

8 Claims, 14 Drawing Sheets

TELEVISION SIGNAL PROCESSING APPARATUS

This application is a division of now abandoned application Ser. No. 285,526, filed on Dec. 16, 1988, now abandoned.

BACKGROUND OF THE INVENTION

1. Field of the Invention

The present invention relates to a television signal processing apparatus which is capable of transmitting video signals having a different aspect ratio from that of the existing television systems, while being compatible with the existing television system.

2. Description of the Prior Art

In Japan, over 20 years have passed since the color television broadcast under the existing NTSC (National Television System Committee) system started in 1960. During that period of time, various new television systems have been proposed in response to the needs of a high definition picture and due to the improvements of performance of television receivers. The contents of TV programs broadcasted have been changed from mere studio-made programs or relay programs to programs providing images of high pictorial quality which make impressions of a presence of an actual scene, such as the cinema-sized broadcasting of movies.

The specifications of the existing television broadcasting are as follows: the number of scanning lines: 525, interlace scanning, luminance signal horizontal bandwidth: 4.2 MHz, aspect ratio: 4 : 3. (cf., i.e. a publication on the broadcast technology, titled "Color Television" edited and issued by The Japan Broadcasting Corporation (NHK) 1961) When a movie is put on the air, the picture size of the movie must be adapted to the aspect ratio of 4 : 3 of the existing television receivers by cutting both sides of the movie picture or by providing dead spaces on the upper and lower regions of a tube face so that the aspect ratio of the usual picture area will corresponding to the value of the movie.

As described above, there lies a problem that when a movie or a picture from which one may receive impressions of an actual presence in a scene is televised under the existing broadcast system, a part of the picture is to be cut or the area of the picture must be reduced, thereby failing to convey a complete message of the producer. A mere transmission of signals having a larger aspect ratio than that of 4 : 3 would disable the ordinary TV sets from receiving said signals in a normal manner. With the number of scanning lines and the frame frequency being equal to those of the existing broadcast system, in order to obtain the same horizontal resolution, the video bandwidth which is m/4 times bigger than that of the existing aspect ratio is required with respect to the aspect ratio of m : 3 (m is an actual number larger than 4). However, in view of the effective utilization of electric wave resources, it is impossible to widen a transmission band in a disorderly manner.

A number of methods are here considered for widening the aspect ratio while remaining compatible with the existing television system. For example, when an original picture is picked up with an aspect ratio of m : 3 which has a larger frame size than the conventional one, firstly the video signals are time-axis expanded by m/4 times which correspond to the portion appearing on the tube face of the existing television receiver with the aspect ratio of 4 : 3. In order to obtain information of picture area with an aspect ratio of m : 3, among the remaining portions of the video signals, the low frequency component will be transmitted by way of time-axis multiplexing and the high frequency component by non-time-axis multiplexing, that is, multiplexing methods such as quadrature modulation or frequency interleaving or other methods which are not time-division multiplexing methods, (see our U.S Pat. application No. 070804 filed Jul. 7, 1987 and U.S Pat. application No. 174452 filed Mar. 23, 1988 and "A Single Channel NTSC Compatible Widescreen EDTV System" by M. Isnardi et al, HDTV Colloquium in Ottawa, Oct., 1987). FIGS. 12(a)–12(c) are a spectrum views showing a non-time-axis multiplex processing method of one embodiment of the prior art. FIG. 12(a) is a spectrum view of a television signal amplitude-modulated for vestigial side band. FIG. 12(b) shows a multiple signal other than the television signal as shown in FIG. 12(a) wherein the multiple signal is a modulated version for a vestigial side band of a carrier P2 which is same in frequency as carrier P1 but out of phase therewith FIG. 12(c) shows a multiplexing of the signal of FIG. 12(b) and the signal of FIG. 12(a). The bandwidth of the multiple signal is not restricted to this.

As for the method for non-time-axis multiplex processing, there is a method wherein multiplexing takes place in the first and third quadrants which are positions conjugate to chrominance sub carriers on the temporal-vertical two-dimensional frequency plot (see Japanese Laid-Open Patent Publication No. 59-171387).

However, there was no clear and concrete indication of how the luminance and chrominance signals of the video signals as well as the time-axis will be processed in such methods.

SUMMARY OF THE INVENTION

An object of the present invention is to provide a television signal processing apparatus which is compatible with the existing television system and serves to produce television signals having a large aspect ratio.

For the purpose of attaining the above-described object, the present invention provides a television signal processing apparatus at the transmission side comprising a signal producing block adapted to perform time-axis compression, time-axis expansion and chrominance signal processing of an electrical signal obtained from an original received picture and having an aspect ratio larger than the standard one, so as to thereby produce a main signal and a multiple signal, and a non-time-axis multiplexing block for multiplexing the main signal and the multiple signal.

Furthermore, the present invention provides a television signal processing apparatus at the reception side comprising a non-time-axis multiplexed signal separation block for separating said multiplexed signals, a block for separating a luminance signal and a chrominance signal, a block for demodulating the chrominance signal, a block for effecting time-axis compression, a block for expanding on time-axis the signal multiplexed on time-axis, and a block for compressing on time-axis the non-time-axis multiplexed signals.

The foregoing structure enables production of television signals which are capable of, while compatible with the existing television system, transmitting in a multiplexing manner picture information having an aspect ratio larger than the standard one. A TV receiver constructed for the intended purpose can receive without difficulties picture images of the conventional television broadcast by means of the time-axis compression on one hand and obtain pictures having a larger aspect ratio than conventional by use of the synchronous detection, time-axis compression, time-axis expansion, etc. Even a TV receiver of the conventional type but provided with said structured device may receive pictures of the conventional television broadcast without difficulties.

DESCRIPTION OF THE PREFERRED EMBODIMENTS

Figure 1:
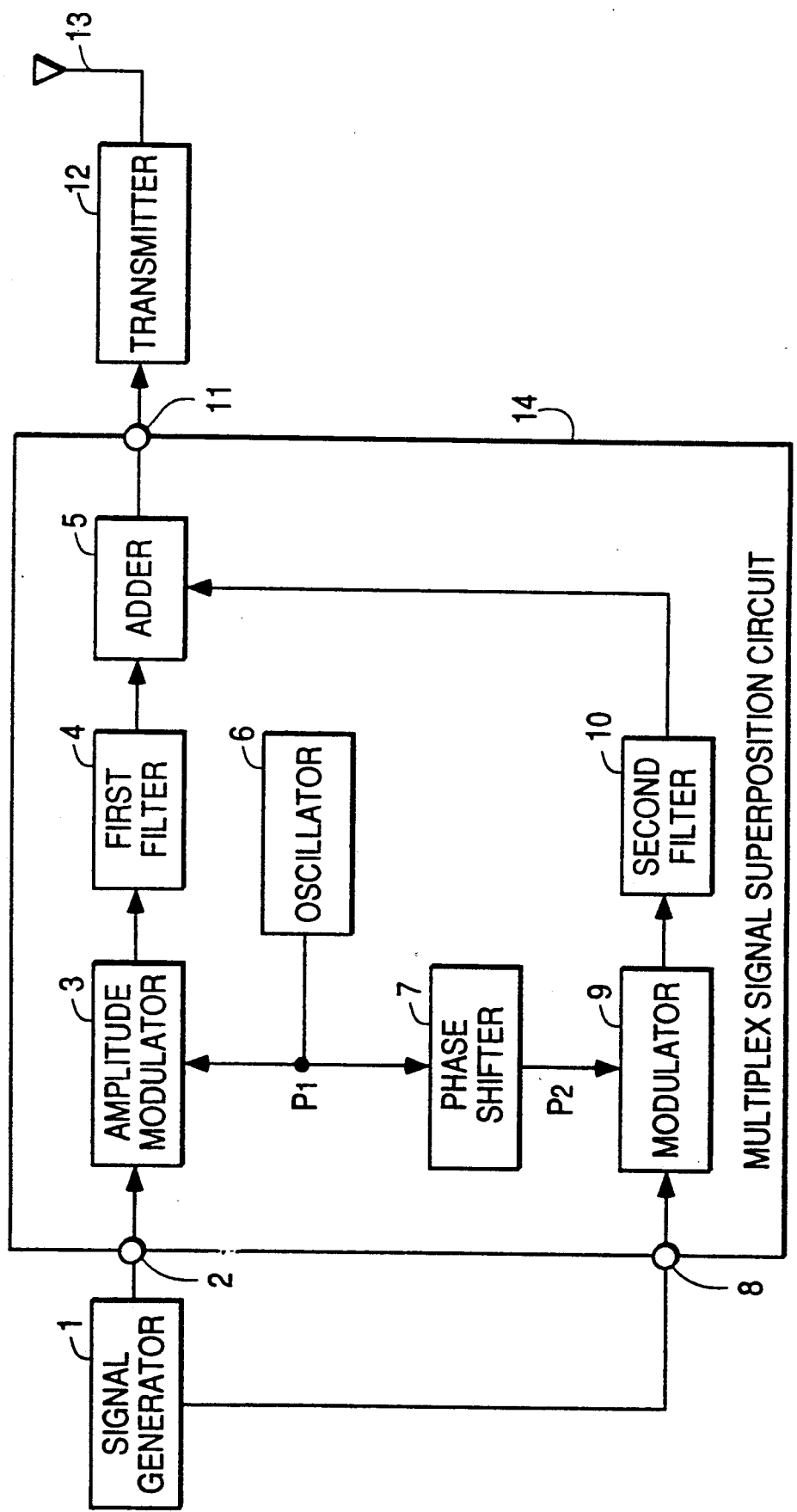
FIG. 1 is a block diagram of the television signal processing apparatus at the transmission side in accordance with one embodiment of the present invention.

FIG. 1 is a block diagram of a television signal processing apparatus at the transmission side in accordance with one embodiment of the present invention. In this drawing, element 1 is a signal generator; element 2 is a main signal input terminal; element 3 is an amplitude modulator element 4 is a first filter element 5 is an adder element 6 is an oscillator element 7 is a phase shifter element 8 is a multiplex signal input terminal element 9 is a modulator element 10 is a second filter element 11 is a composite signal output terminal element 12 is a transmitter element 13 is an antenna, and 14 a multiplex signal superposition circuit.

Figure 12A:
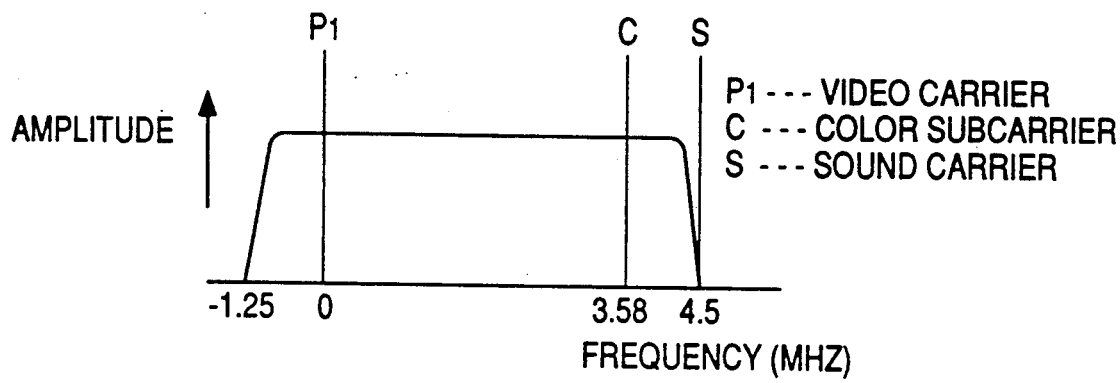
FIG. 12(a) is a spectral view showing a television signal amplitude-modulated for vestigial side band in the existing television system.
Figure 12B:
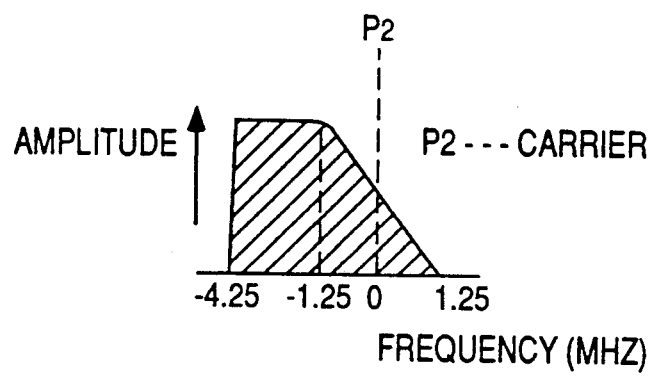
FIG. 12(b) is a spectral view of a band limited signal modulated by a signal other than the signal as shown in FIG. 12(a), as one embodiment of prior art.
Figure 12C:
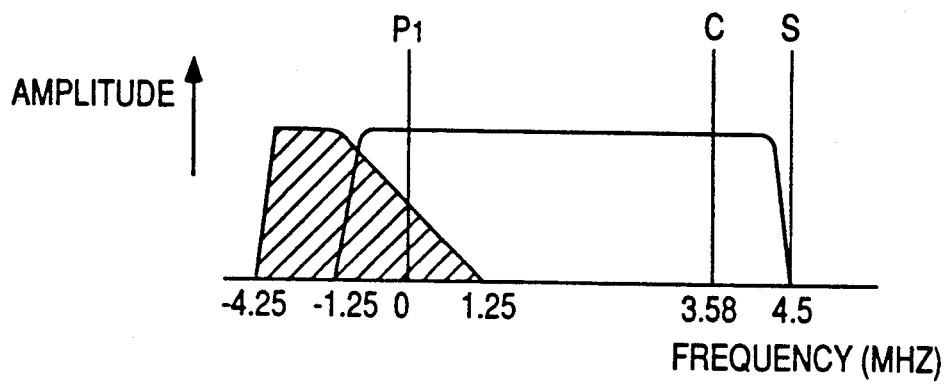
FIG. 12(c) is a spectral view showing a multiplexing between the signal of FIG. 12(b) and the signal of FIG. 12(a)

The signal generator 1 serves to produce a main signal and a multiplex signal. The main signal is inputted from the main signal input terminal 2 to the multiplex signal superposition circuit element 14 is. The multiplex signal is inputted from the multiplex signal input terminal 8 to the multiplex signal superposition circuit 14. The main signal inputted into the multiplex signal superposition circuit 14 is used by the amplitude modulator 3 to amplitude-modulate a carrier Pl obtained from the oscillator 6. The obtained amplitude modulation wave is band-limited by the first filter 4 to turn into a vestigial side band before being input to the adder 5. The carrier Pl obtained from the oscillator 6 shall be a modified version called "carrier P2" when the phase of the former has been shifted by the phase shifter 7. When the outputs of the first and second filters 4 and 10 are added together by the adder 5, the phases of the carriers are shifted so that they will intersect one another at right angles. The carrier P2 is amplitude-modulated at its double side band by the modulator 9, using a multiplex signal inputted into the multiplex signal superposition circuit 14 for carrier suppression, preferably at least for a blanking period. After being band-limited by the second filter 10, the output of the modulator 9 is input to the adder 5. The output from the adder 5 will be a composite signal. The composite signal will be transmitted by the transmitter 12 through the antenna 13. The frequency characteristic of the second filter 10 here shall possess a characteristic feature as shown in FIG. 12(b).

Figure 2:
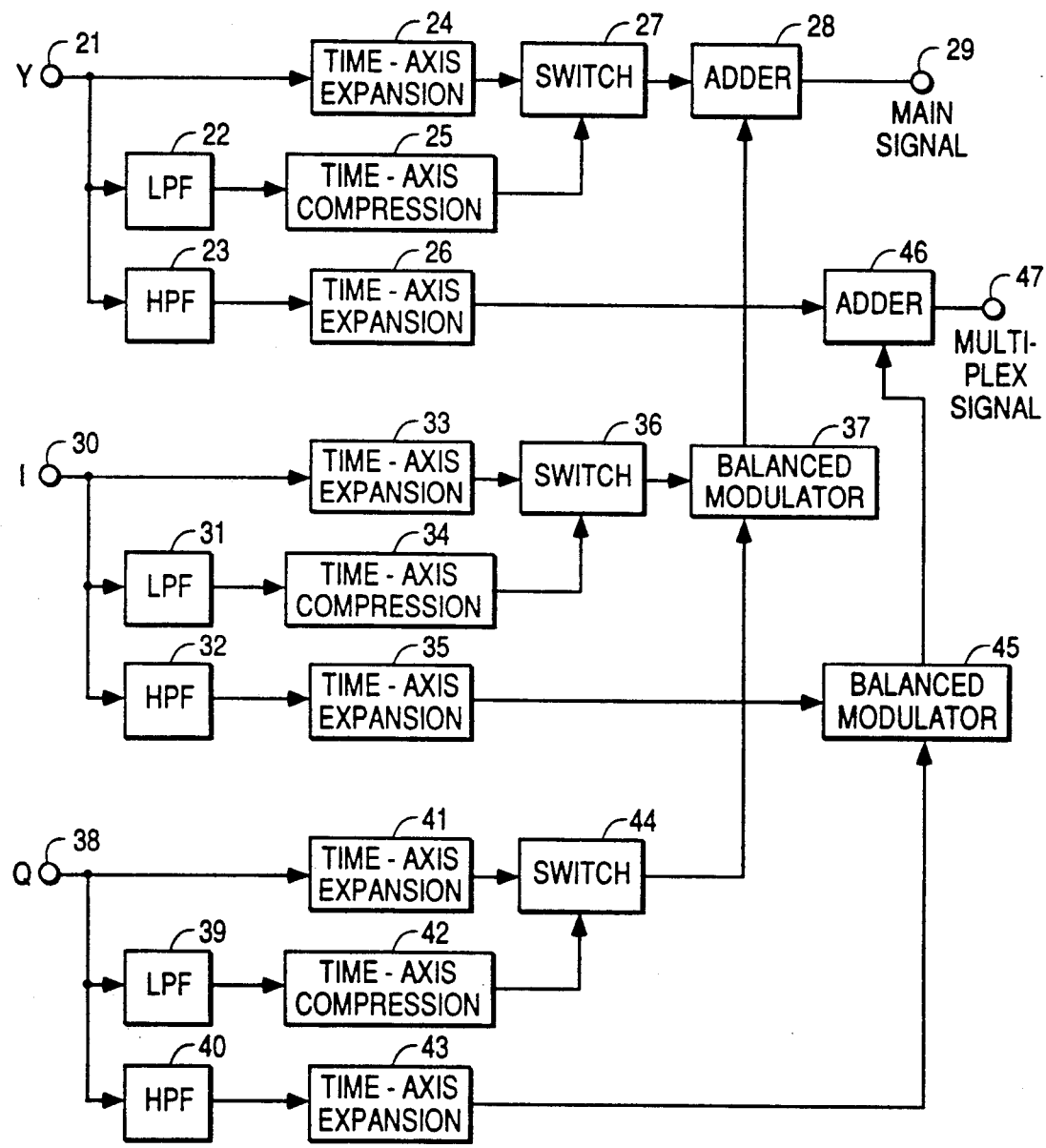
FIGS. 2 and 3 are block diagrams showing one example of the internal configuration of the signal generator of FIG. 1.

FIG. 2 is a block diagram showing one example of the internal configuration of the signal generator 1 of FIG. 1. Element 21 is an input terminal for a luminance signal Y obtained from a picture signal taken by a camera having, for example, an aspect ratio larger than the usual aspect ratio, element 30 is an input terminal for a chrominance signal I obtained from said picture signal; element 38 is an input terminal for a chrominance signal Q obtained from said picture signal; element 24, 26, 33, 35, 41, and compression circuits; element 27, 36 and 44 are switches 22, 31, and 39 are LPFs (low-pass filters), element 23, 32, and 40 are HPFs (high-pass filters); elements 28 and 46 are adders; elements 37 and 45 are balanced modulators; element 29 is a main signal output terminal, and element 47 is a multiplex signal output terminal.

The signal corresponding to the portion formed on the screen of a television receiver shall be referred to as a first signal, and other signal, e.g. the one corresponding to the both sides, shall be referred to or one side as a second signal. The luminance signal Y obtained through known matrix circuits from a signal into which the images have been converted by a camera having a larger aspect ratio than the usual one is, for example, inputted into the time-axis expansion circuit 24, and LPF 22 and HPF 23.

If an original picture is taken with a large aspect ratio of m : 3, the first signal corresponding to the portion formed on the screen of a usual TV set will be time-axis expanded by m/4 times by the time-axis expansion circuits 24, 33, 41. With the CCD camera requiring a shorter horizontal blanking period than a camera tube, it is not always necessary to time-axis expand the signal corresponding to the portion formed on the screen of the usual television set.

Figure 13A:
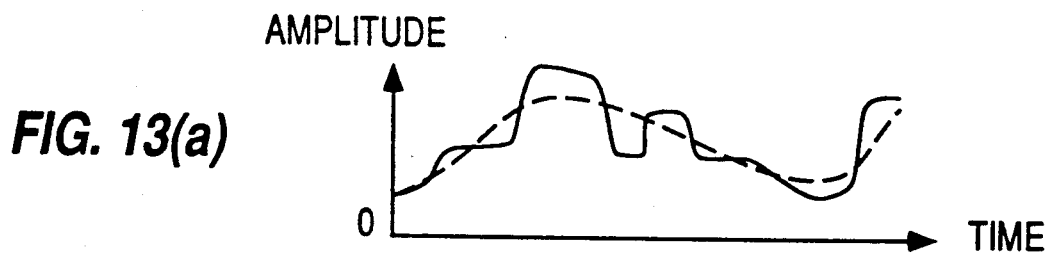
FIGS. 13(a)-13(e) are views of signal waveforms showing the courses of processing of signals in the form of the time-axis compression and time-axis expansion.
Figure 13B:
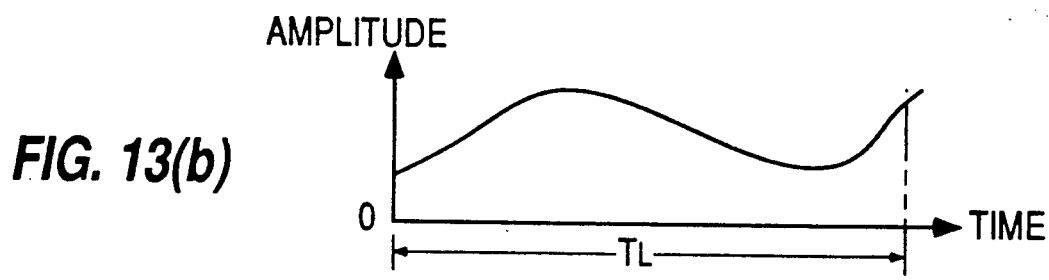
Figure 13C:
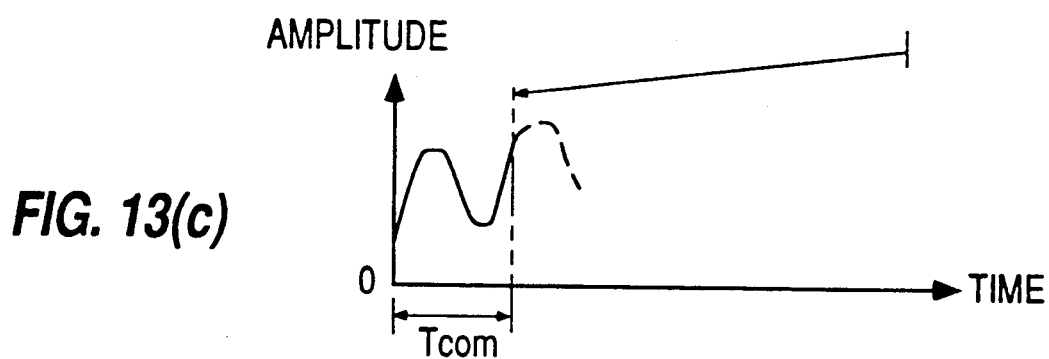
Figure 13D:
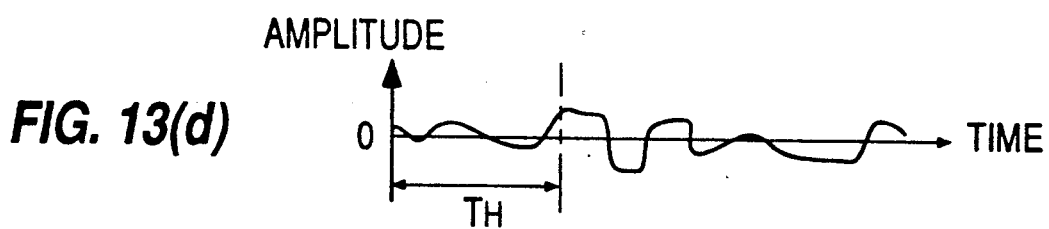
Figure 13E:
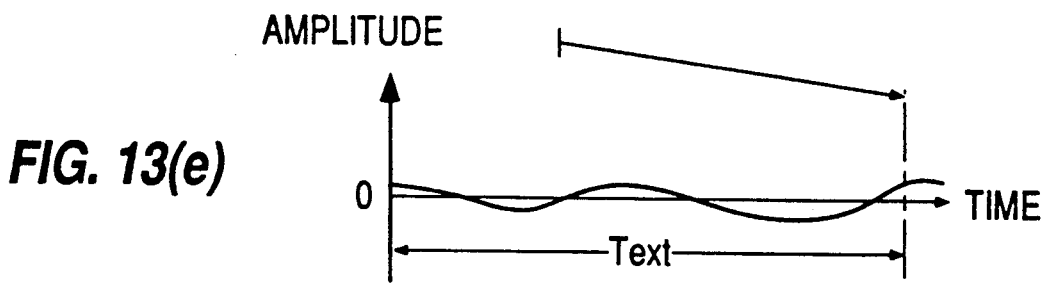
Figure 14A:
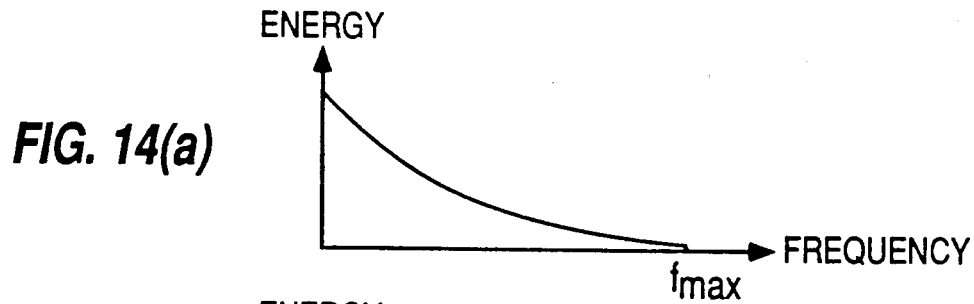
FIGS. 14(a)-14(e) are views showing in spectrum the signal waveform of FIGS. 13(a)-13(e).
Figure 14B:
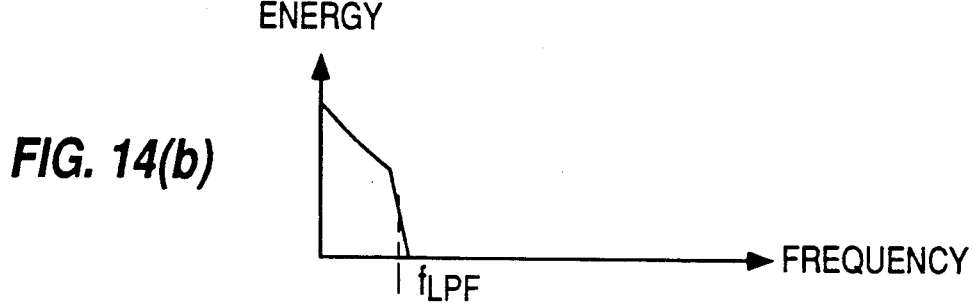
Figure 14C:
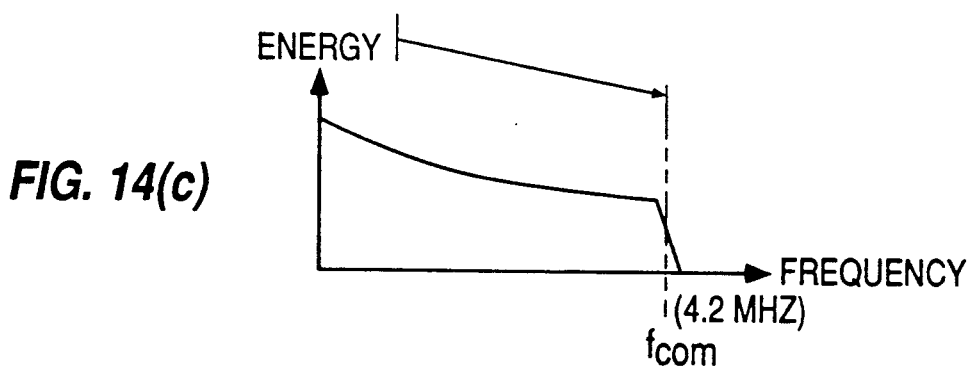
Figure 14D:
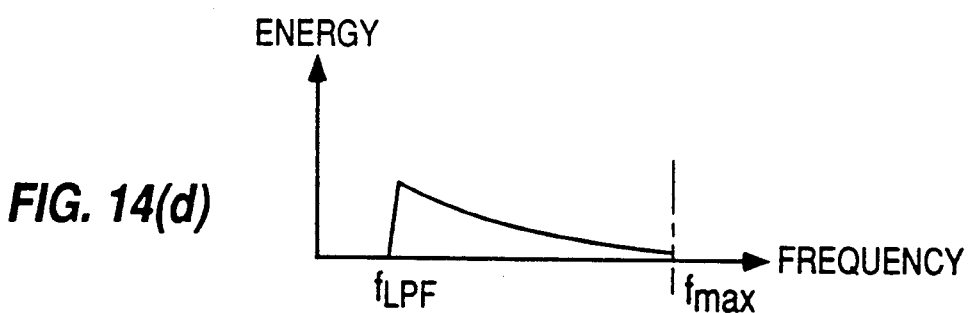
Figure 14E:
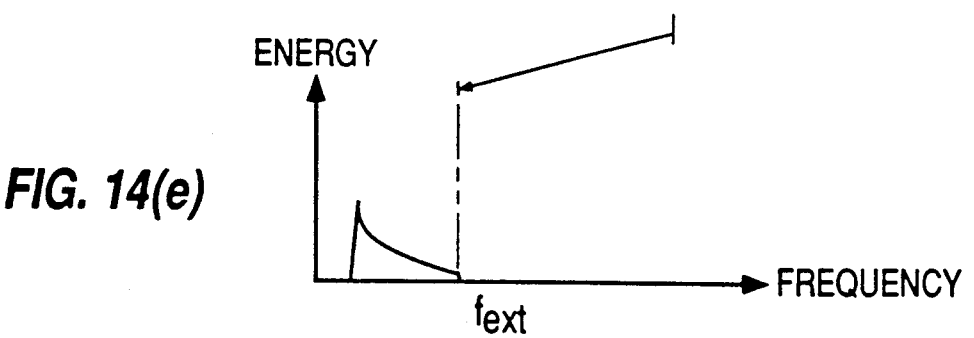

The luminance signal has on the time axis a waveform as shown by FIG. 13(a) by way of example, while on the frequency axis is represented by a low spectrum distribution by the energy of high frequency component as a general characteristic of the picture signal (see FIG. 14(a)). The luminance signals of the second signal corresponding to the portion of the opposite sides or one side of the screen are divided by the LPF 22 and HPF 23 into a low frequency component of high energy (the waveform of FIG. 13(b) and frequency spectrum of FIG. 14(b)) and a high frequency component of comparatively low energy (the waveform of FIG. 13 (d) and frequency spectrum of FIG. 14(d)) to be delivered to the time-axis compression circuit 25 and the time-axis expansion circuit 26 respectively. In the time-axis compression circuit 25, as illustrated by FIG. 13(c), the low frequency component as shown in FIG. 13(b) is time-axis compressed to such a degree that the latter will turn into a frequency spectrum which may occur below the band transmissible by the NTSC system. The resultant low frequency component is fed to the switch 27, where it and the output of the time-axis expansion circuit 24 are time-axis multiplexed together. In the time-axis compression circuit 25, time adjustment is carried out so that the time-axis compression signal will be time-axis multiplexed during at least part of an overscanning period for electron beams or a part of the front porch in the period of the horizontal blanking.

The general receiver overscans electron beams on the order of 8% of the usual picture area. Consequently, if the time-axis compressed signals are timely adjusted during the period corresponding to, for example, 2% of said percentage and 2% of the usual picture area of the front porch so that the time-axis compressed signals will be time-axis multiplexed, then no time-axis multiplexed signal will affect the reproduced images of the usual TV receivers. The adjustment of the time-axis may be performed by delaying signals using memory, for example. The time-axis expansion and time-axis compression may be achieved by, for example, changing write clocks and read clocks of a memory.

In the time-axis expansion circuit 26, the high frequency component as shown in FIG. 13(d) is time-axis expanded as shown in FIG. 13(e) to such an extent that it will be positioned below the bands where the band can be non-time-axis multiplexed. Signals which are band-compressed by means of the time-axis expansion circuit 26 are inputted into the adder 46.

Chrominance signals I and Q are similarly processed. For example, the chrominance signals I and Q obtained from signals into which visual images have been converted by a camera having a larger aspect ratio than the usual one are inputted into the time-axis expansion circuits 33 and 41 LPF 31 and 39 and HPF 32 and 40 respectively. When an original picture image is received with an aspect ratio of m : 3 (i.e. - a picture width greater than that of the conventional image), the first signal corresponding to the visual spot appearing on the screen of the usual TV set is time-axis expanded by m/4 times by the time-axis expansion circuits 33 and 41 as in the case of the luminance signal Y. The chrominance signals I and Q of the second signals corresponding to the regions of the both sides or one side of the picture tube are separated by the LPFs 31 and 39 and the HPF 32 and 40 into a low frequency component of high energy and a high frequency component of comparatively low energy respectively, and the both components will be supplied to the time-axis compression circuits 34 and 42 and the time-axis expansion circuits 35 and 43. The time-axis compression rate, time-axis expansion rate and time-axis adjustment are the same as in the case of the luminance signal.

The signals time-axis compressed are fed to the switches 36 and 44 respectively, where said signals are time-axis multiplexed with the outputs of the time-axis expansion circuits 33 and 41 respectively. The outputs of the switches 36 and 44 are quadrature-modulated by the balanced modulation circuit 37 and added to the output of the switch 27 by means of the adder 28. The output of the adder 28 will be a main signal.

The outputs of the time-axis expansion circuits 35 and 43 are quadrature-modulated by the balanced modulation circuit 45 and added by the adder 46 to the outputs of the time-axis expansion circuit 26. The output of the adder 46 will be a multiplex signal.

If the HPFs 32 and 40 are replaced by LPFs, then the LPFs 31 and 39, the time-axis compression circuits 34 and 42 the and switches 36 and 44 may be omitted.

Figure 3:
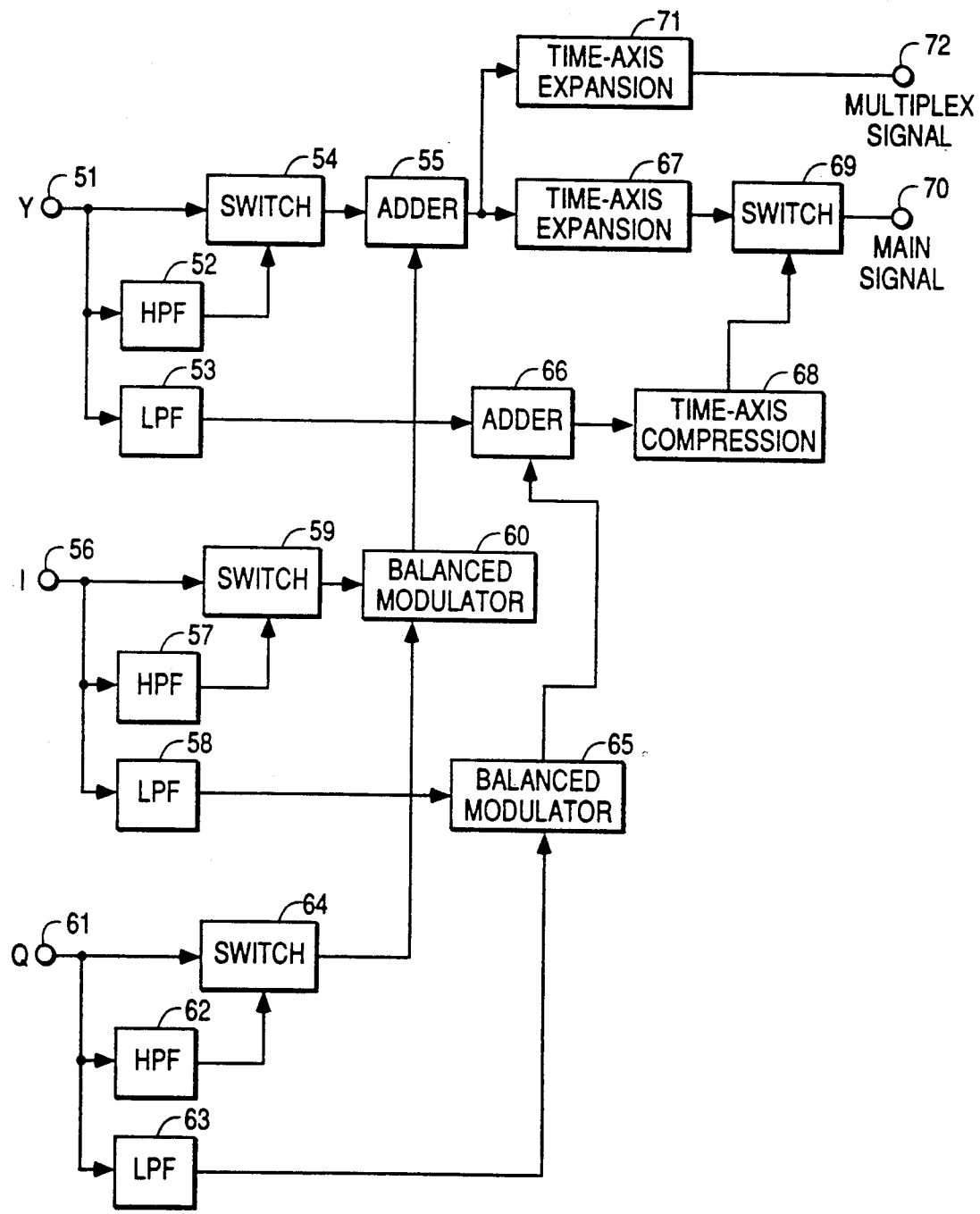

FIG. 3 is a block diagram showing one example of the internal configuration of the signal generator 1 of FIG. 1. Element 51 is, for example, an input terminal for the luminance signal Y obtained from signals into which images have been converted by the camera, with a larger aspect ratio than the usual one; element 56 is an input terminal for the chrominance signal I obtained from said picture signals element 61 is an input terminal for the chrominance signal Q obtained from said signal; elements 67 and 71 are time-axis expansion circuits; element 68 is a time-axis compression circuit; elements 54, 59, 64 and 69 are switches 53, 58, and 63 are LPFs; 54, 59, 64 and 69 are switches 53, 58, and 63 are LPFs; elements 52, 57 and 62 are HPFs; elements 55 and 66 are adders; elements 60 and 65 are balanced modulation circuits; element 70 is a main signal output terminal, and element 72 is an output terminal for the multiplex signal.

For example, the luminance signals Y obtained from signals into which received images have been converted by the camera with a larger aspect ratio than the usual one through a known matrix circuit are inputted into the switch 54, the LPF 53 and the HPF 52 respectively. When an original picture image is picked up with a conventional aspect ratio of m : 3 having a greater frame width, the first signal corresponding to the visual spot appearing on the screen of a television set of the usual type is passed through the switch 54 into the adder 55. The luminance signals of the second signal corresponding to the spot(s) of the opposite sides or one side of the screen are separated respectively by the LPF 53 and the HPF 52 into a low frequency component and a high frequency component so that the both components will be supplied to the adder 66 and the switch 54 respectively. During the period corresponding to the spot of the both sides or one side of the screen, the output of the HPF 52 is passed through the switch 54 into the adder 55.

The chrominance signals I and Q are similarly processed. For example, the chrominance signals I and Q obtained via the known matrix circuit from signals into which visual images have been converted by a camera having a larger aspect ratio than the usual one are inputted into the switches 59 and 64, the LPFs 58 and 63 and the HPFs 57 and 62 respectively. The chrominance signals I and Q of the first signals are passed through the switches 59 and 64 respectively into the balanced modulator 60. The chrominance signals I and Q of the second signals are separated by the LPF 58 and 63 and HPFs 57 and 62 into a low frequency component and a high frequency component. The outputs of HPFs 57 and 62 are passed is fed through the switches 59 and 64 into the balanced modulator 60 respectively during the period corresponding to the spot of the both sides or one side of the screen. The signals, after being subjected to quadrature-modulation, are inputted into the adders 55 and 66.

Among the outputs of the adder 55 the signals corresponding to the spot appearing on the screen of a usual television receiver are time-axis expanded by the time-axis expansion circuit 67 and then inputted into the switch 69. A time-axis expansion by m/4 times occurs in the time-axis expansion circuit 67. All of the signals, except for said signals, are time-axis expanded by the time-axis expansion circuit 71. In said time-expansion circuit 71, the high frequency component as shown in FIG. 13(d) is time-axis expanded so that the band will be located under the bands where non-time-axis multiplexing may take place as illustrated in FIG. 13(e). The outputs of the adder 66 is time-axis compressed by the time-axis compression circuit 68 and inputted into the switch 69. In the time-axis compression circuit 68, the low frequency components shown in FIG. 13(b) are time-axis compressed so that said low frequency components will be a frequency spectrum which may occur below the bands transmissible by way of NTSC system as shown in FIG. 13(c), and then delivered to the switch 69 where it will be time-axis multiplexed. The output of the switch 69 will be a main signal. The output of the time-axis expansion circuit 71 will be a multiplex signal. In the time-axis compression circuit 68, time adjustment shall be held during the period of at least part of a period where an over-scanning of electron beams is carried out in the receiver, or part of the front porch of a period of the horizontal blanking so that the time-axis compressed signals may be time-axis multiplexed.

If the HPF 57 and 62 are replaced by an LPF, the the LPFs 58 and 63, the balanced modulator 65 and the adder 66 may be omitted.

Though blanking period signals such as synchronization signals or burst signals have been omitted, reference signals or identification signals may be multiplexed during the blanking period. The reference signal may be construed as a standard reference signal for correcting white signal levels. black signal levels, amplitudes of chrominance signals, phases, etc. or a control signal for controlling regenerative carriers. The identification signal is, for example, a signal for distinguishing said composite signal from television signals for use in the existing broadcasting.

Since the time-axis expanded signals are widened in band by subjecting them to time-axis compression at the reception side, even a larger aspect ratio will cause no decrease of the resolution. Of the second signals corresponding to information on the both sides or one side of the screen face outside the frame of aspect ratio 4 : 3, non-time-axis multiplexed signals are destined to be almost erased by the synchronous detection with aide of a video carrier in the existing receiving system in the event of the intersection of the existing television with spectrums. whereby interference due to the non-time-axis multiplex signals will rarely occur. In the receiver for demodulating multiplex signals, main signals can be taken out without any quadrature distortion as in the existing receiver, and by conducting a synchronous detection by a phase-controlled video carrier and by use of a filter can be picked up also non-time-axis multiplexed signals corresponding to informations of the both sides or one side of the screen face outside the frame of aspect ratio 4 : 3 without quadrature distortion involved. Also, the signals subjected to time-axis multiplexing may be reproduced by a process such as time-axis expansion. That is, the reproduction can be provided of an original picture image having an aspect ratio larger than 4 : 3 and received at the transmission side.

Figure 4:
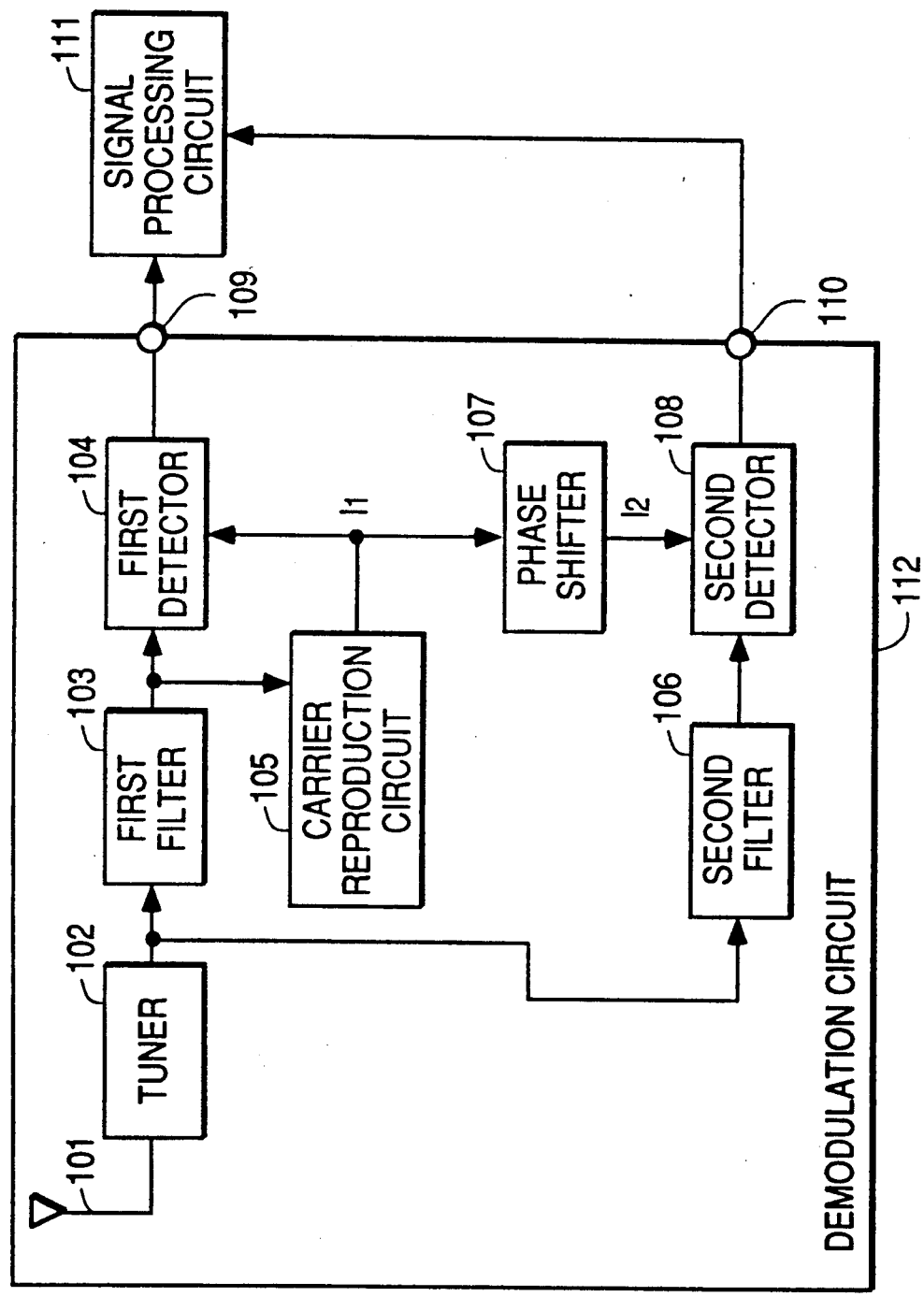
FIG. 4 is a block diagrams of the television signal processing at the reception side in accordance one embodiment of the present invention.

Next, the signal processing at the reception side in accordance with one embodiment of the present invention will be described. Reference will be made to the reception of, for example, TV signals joined together by said signal processing. FIG. 4 is a block diagram of the television signal processing apparatus at the reception side in accordance with one embodiment of the present invention. In the drawing; element 101 is an antenna element 102 is a tuner element 103 is a first filter element 104 is a first detector element 105 is a carrier reproduction circuit element 106 is a second filter element 107 is a phase shifter element 108 is a second detector element 109 is a main signal output terminal element 110 is a multiplex signal output terminal element 111 is a signal processing circuit, and element 112 is a demodulation circuit.

A signal produced at the transmission side is received by the antenna 101, and frequency-converted to the intermediate frequency band by means of the tuner 102. and band-limited by the first filter 103. Though the antenna is specifically shown, the transmission may also be by cable. The band-limited signal is fed to the first detector 104 and the carrier reproduction circuit 105, where a carrier I1 will be produced for synchronous detection. The synchronous detection of the band-limited signal is carried out by the carrier I1 in the first detector 104. The output of the first detector 104 shall be a main signal.

The output of the tuner 102 is band-limited by the second filter 106. The band-limited signal is synchronously detected in the second detector 108 by means of a carrier I2 which has been shifted in phase from the carrier I1 and which is obtained from the carrier reproduction circuit 105. It is noted that the amount of phase shift of the carrier I2 should be consistent with that of the transmission side. The detection output will be a multiplex signal. The main signal and the multiplex signal are inputted into the signal processing circuit 111. For non-time-axis multiplexing of multiplex signals. a method is considered wherein the signals are multiplexed in first and third quadrants which are conjugate positions to chrominance sub carriers in the plane of the time-vertical frequency. With the signal demodulated into a base band at the reception side, the separation of the main signal from the multiplex signal may be dependent on whether at least the phase of the chrominance sub carrier takes up a difference of a signal with which the chrominance sub carrier will be in phase or a sum of a signal with which the chrominance sub carrier will be opposite phase between the fields.

Figure 5:
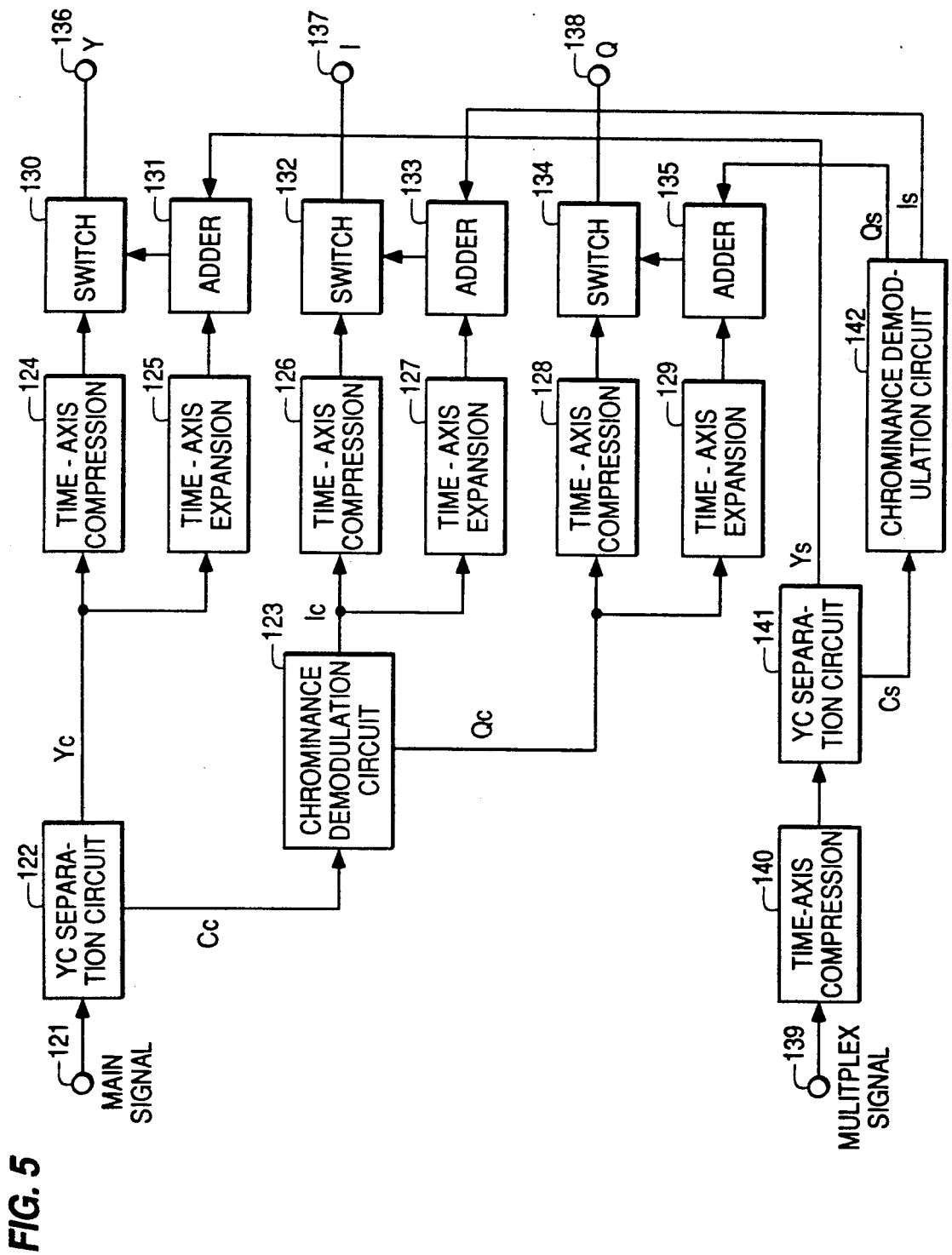
FIGS. 5, 6, 7, 8, 9, 10, and 11 are block diagrams showing the internal structure of the signal processing circuit 111 of FIG. 4.

FIG. 5 is a block diagram showing one embodiment of the internal structure of the signal processing circuit 111 of FIG. 4. Element 121 is a main signal input terminal element 139 is a multiplex signal input terminal elements 122 and 141 are YC separation circuits elements 123 and 142 arechrominance demodulation circuits elements 124, 126, 128, and 140 are time-axis compression circuits; elements 125, 127, and 129 are time-axis expansion circuits; element 130, 132, and 134 are switches, elements 131, 133, and 135 are adders; element 136 is an output terminal for luminance signal Y; element 137 is an output terminal for chrominance signal I, and element 138 is an output terminal for chrominance signal Q.

The main signals inputted from the main signal input terminal 121 are separated by the YC separation circuit 122 into luminance signals Yc and chrominance signals Cc. Among the Yc signals which have been outputted from the YC separation circuit 122, the signals corresponding to the screen face of the existing television having an aspect ratio of 4 : 3 and having been time-axis expanded at the transmission side are time-axis compressed by the time-axis compression circuit 124, while the other signals having been time axis compressed at the transmission side are time-axis expanded by the time-axis expansion circuit 125. In the time-axis compression circuit 124 and the time-axis expansion circuit 125, reverse time-axis processing and time-axis regulation take place respectively to the time-axis expansion and time-axis compression at the transmission side so that the transmission and reception are combined together to keep a normal time relationship.

The chrominance signals Cc from the YC separation circuit 122 are demodulated by the chrominance demodulation circuit 123 into Ic signals and Qc signals. As in the case of the Yc signals, among the Ic and Qc signals, signals which have been time-axis expanded at the transmission side and corresponding to the region of the aspect ratio of 4 : 3 are time-axis compressed by the time-axis compression circuits 126 and 128, while the other signals which have been time-axis compressed at the transmission side are time-axis expanded by the time-axis expansion circuits 127 and 129.

On the other hand, multiplex signals produced from the multiplex signal input terminal 139 are time-axis compressed by the time-axis compression circuit 140 and then separated by means of the YC separation circuit 141 into luminance signals Ys and chrominance signals Cs. The chrominance signals Cs are demodulated by the chrominance demodulation circuit 142 into Is and Qs signals. The luminance signals Ys are added to the output of the time-axis expansion circuit 125 by the adder 131 and then inputted into the switch 130. In the switch 130, the output of the time-axis compression circuit 124 will be produced during the period corresponding to the region of the aspect ratio of 4 : 3, while the output of the adder 131 will be produced during other periods.

Similarly, Is signals are added to the output of the time-axis expansion circuit 127 by the adder 133 and then inputted into the switch 132. In the switch 132, the output of time-axis compression circuit 126 will be produced during the period corresponding to the region of the aspect ratio 4 : 3 and the output of the adder 133 will be produced during other periods as chrominance signals I respectively.

Similarly, Qs signals are added to the output of the time-axis expansion circuit 129 by the adder 135 and then inputted into the switch 134. In the switch 134, the output of the time-axis compression circuit 128 will be produced during the period corresponding to the region of the aspect ratio of 4 : 3 and the output of the adder 135 will be produced during other periods as chrominance signals respectively. The luminance signals Y, chrominance signals I, and chrominance signals Q may be monitored after being converted to R,G,B signals by a matrix circuit.

If chrominance signals are not superposed on signals which have been time-axis multiplexed, then the time-axis expansion circuits 127 and 129, and adders 133 and 135 are not necessary, and so the outputs Is and Qs of the chrominance demodulation circuit 142 may be inputted into the switches 132 and 134 respectively.

To ensure that the existing television broadcast will be received without difficulties, the time-axis compression circuits 124, 126 and 128 are intended for restoring TV signals by compressing portions, time-axis expanded, of said TV signals having the aspect ratio with a greater frame width. That is, in order that a visual image can be received in conformity with the conventional aspect ratio, it is necessary to time-axis compress the existing television signals. Its compression ratio is dependent on the aspect ratio used. However, in case a display means is of a liquid crystal type which doesn't require as large a blanking period as a CRT, the time-axis compression is not always necessary. In the reception of the existing television signals, an image with the aspect ratio of 4 : 3 may be positioned near the central portion of the TV picture tube, whereas the remaining portions of the picture tube with an aspect ratio of a larger frame width are darkened by blanking.

Figure 6:
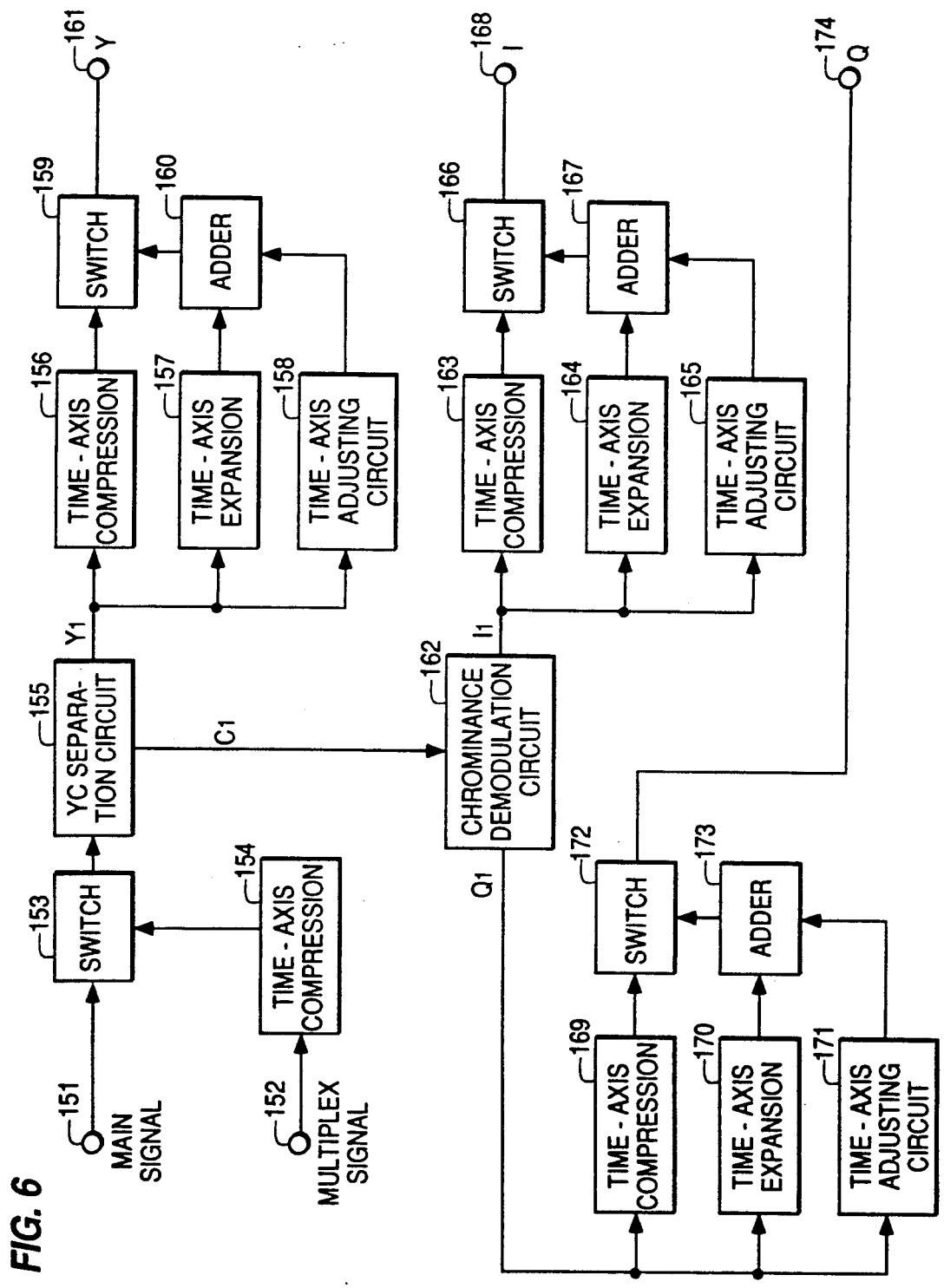

FIG. 6 is a block diagram showing one example of the internal structure of the signal processing circuit 111. Element 151 is a main signal input terminal; element 152 is a multiplex signal input terminal; elements 153, 159, 166, and 172 are switches; element 155 is a YC separation circuit; element 162 is a chrominance demodulation circuit; elements 154, 156, 163, and 169 are time-axis compression circuits, 157; elements 157 164, and 170 are time-axis expansion circuits; elements 160, 167 and 173 are adders elements 158 and 165 are time axis regulation circuits; elements 161 is a luminance signal Y output terminal; element 168 is a chrominance signal I output terminal, and element 174 is a chrominance signal Q output terminal. Main signals from the main signal input terminal 151 are inputted via the switch 153 to the YC separation circuit at the period of video signals.

Multiplex signals from the multiplex signal input terminal 152 are time-axis compressed at the time-axis compression circuit 154 contrary to the time-axis expansion at the transmission side and then, inputted via the switch 153 to the YC separation circuit 155 at the blanking period and then separated by the YC separation circuit 155 into luminance signals Y1 and chrominance signals C1. Among the Y1 signals produced from the YC separation circuit 155, signals corresponding to the picture tube face of the existing television receiver with the aspect ratio of 4 : 3 and time-axis expanded at the transmission side are time-axis compressed by the time-axis compression circuit 156 and other signals time-axis compressed at the transmission side are time-axis expanded by the time-axis expansion circuit 157.

Subsequently, luminance signals obtained by separating, in the YC separation circuit the multiplexed signals time-axis compressed, during the blanking period, are adjusted at the time-axis regulation circuit 158 so as to form a normal time relationship, and then added to the output of the time-axis expansion circuit 157 by the adder 160. The chrominance signals C1 produced by the YC separation circuit 155 are demodulated by the chrominance demodulation circuit 162 into I1 and Q1 signals. Of the I1 and Q1 signals, as Y1 signals, signals corresponding to the portion of the aspect ratio of 4 : 3 and time-axis expanded at the transmission side are time-axis compressed by the time-axis compression circuits 163 and 169 respectively, and other signals time-axis compressed at the transmission side are time-axis expanded by the time-axis expansion circuits 164 and 170.

On the other hand, chrominance signals, obtained by separating the multiplexed signals time-axis compressed, by the YC separation circuit during the blanking period, are demodulated by the chrominance demodulation circuit 162 into I1 and Q1 signals, regulated by the time-axis regulation circuits 165 and 171, and added to the outputs of the time-axis expansion circuits 164 and 170 by the adders 167 and 173 so as to form a normal time relationship. In the switches 159, 166, and 172, the outputs of the time-axis compression circuits 156, 163 and 169 will be produced at the period corresponding to the portion of the aspect ratio of 4 : 3 and the adders 160, 167 and 173 will be produced at other periods as luminance signals Y, chrominance signals I, and chrominance signals Q.

If the chrominance signals are not superposed on the time-axis multiplexed signals, then the time-axis expansion circuits 164 and 170 and the adders 167 and 173 are no longer required, and the outputs of the time-axis regulation circuits 165 and 171 may be output to the switches 166 and 172 respectively.

As described above, in accordance with the circuit structure of the present invention, the main signals and the multiplexed signals can be processed in the same separate YC separation circuit and chrominance demodulation circuit, which provides a highly effective circuit structure.

Figure 7:
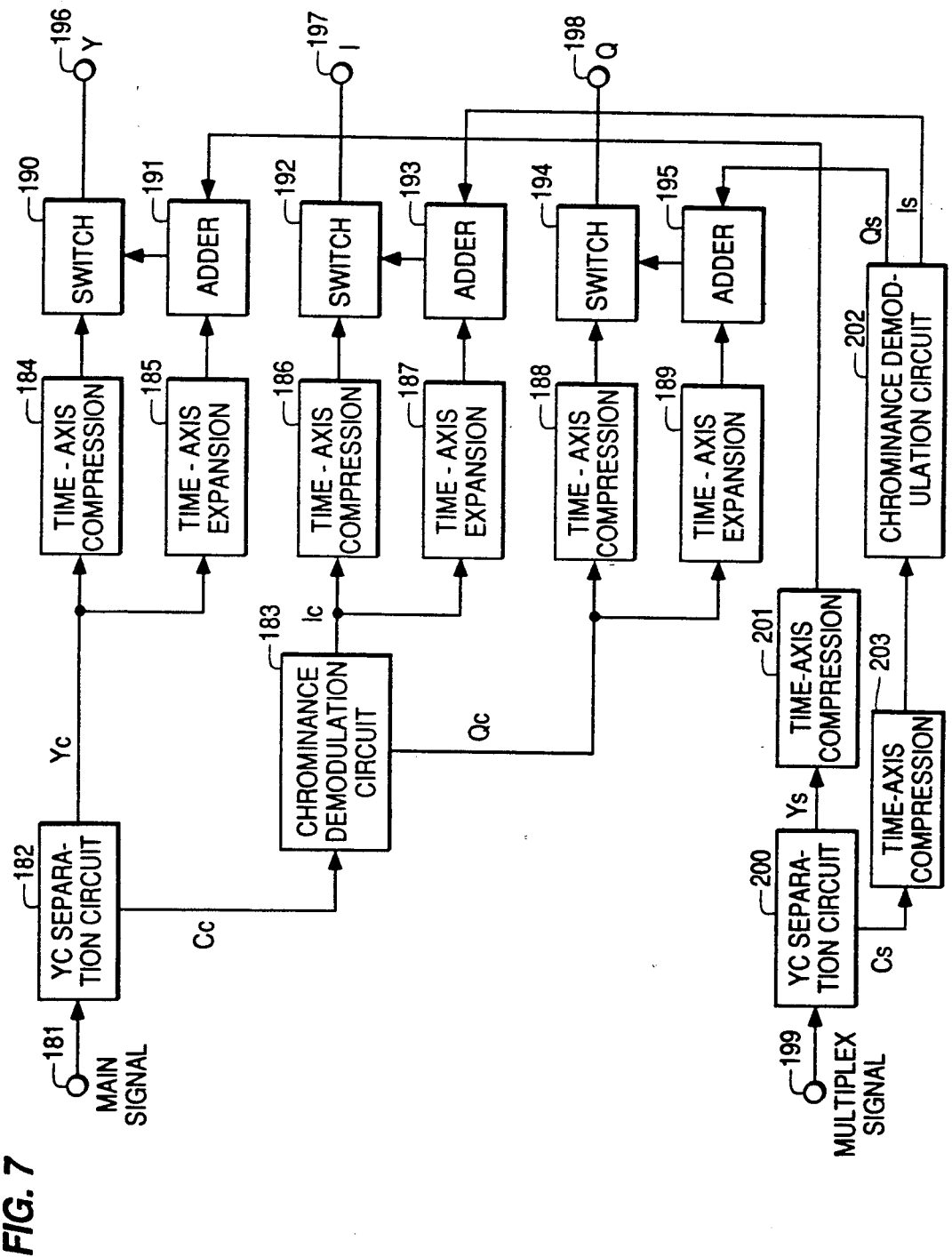

FIG. 7 is a block diagram showing one example of the internal structure of the signal processing circuit 111. Element 181 is a main signal input terminal; element 199 is a multiplexed signal input terminal; elements 182 and 200 are YC separation circuits; elements 183 and 202 are chrominance demodulation circuits; elements 184, 186, 188, 201, and 203 are time-axis compression circuits; element 185, 187, and 189 are time-axis expansion circuits elements 190, 192, and 194 are switches; elements 191, 93, and 195 adders; element 196 is a luminance signal Y output terminal; element 197 is a chrominance signal I output terminal, and element 198 is a chrominance signal Q output terminal.

Main signals from the main signal input terminal 181 are separated by the YC separation circuit 182 into luminance signals Yc and chrominance signals Cc. Among the Yc signals to be outputted by the YC separation circuit 182, signals time-axis expanded at the transmission side and corresponding to the picture tube face of the existing television set with the aspect ratio of 4 : 3 are time-axis compressed by the time-axis compression circuit 184, and other signals time-axis compressed at the transmission side are time-axis expanded by the time-axis expansion circuit 185. The chrominance signals Cc produced from the YC separation circuit 182 are demodulated by the chrominance demodulation circuit 183 into the Ic and Qc signals respectively. As with the Yc signals, among the Ic and Qc signals, signals time-axis expanded at the transmission side and corresponding to the portion of the aspect ratio of 4 : 3 are time-axis compressed by the time-axis compressed circuits 186 and 188 respectively, and other signals time-axis compressed at the transmission side are time-axis expanded by the time-axis expansion circuits 187 and 189.

On the other hand, the multiplexed signals from the multiplexed signal input terminal 199 are separated by the YC separation circuit 200 into luminance signals Ys and chrominance signals Cs, and then time-axis compressed by the time-axis compression circuits 201 and 203 respectively. The outputs of the time-axis compression circuit 203 are demodulated by the chrominance demodulation circuit 202 into Is signals and Qs signals. The outputs from the time-axis compression circuit 201 are added to the output of the time-axis expansion circuit 185 by the adder 191, and then inputted into the switch 190. In the switch 190, the output of the time-axis compression circuit 184 will be produced at the period corresponding to the portion of the aspect ratio 4 : 3, and the output of the adder 191 will be produced at other periods as luminance signals Y respectively.

Similarly, Is signals are added to the output of the time-axis expansion circuit 187 by the adder 193, and then inputted into the switch 192. In the switch 192, the output of the time-axis compression circuit 186 will be produced at the period corresponding to the portion of the aspect ratio 4:3, and the output of the adder 193 will be produced at other periods as chrominance signals I respectively.

Similarly, Qs signals are added by the adder 195 to the output of the time-axis expansion circuit 189, and then inputted into the switch 194. In the switch 194, the output of the time-axis compression circuit 188 will be produced at the period corresponding to the portion of the aspect ratio of 4 : 3, and the output of the adder 195 will be produced at other periods as chrominance signals Q respectively. The chrominance signals Cs as output signals from the YC separation circuit 200 may be time-axis compressed after demodulated, and then inputted into the adders 193 and 195.

If the chrominance signals have not been superposed on the time-axis multiplexed signals, the used of the time-axis expansion circuits 187 and 189 and the adders 193 and 195 is not necessary, and the outputs Is and Qs of the chrominance demodulation circuit 200 may be inputted into the switches 192 and 194 respectively. When the chrominance signals Cs as the output signals from the YC separation circuit 200 are time-axis compressed after being demodulated, the signals time-axis compressed may be delivered to the switches 192 and 194.

Figure 8:
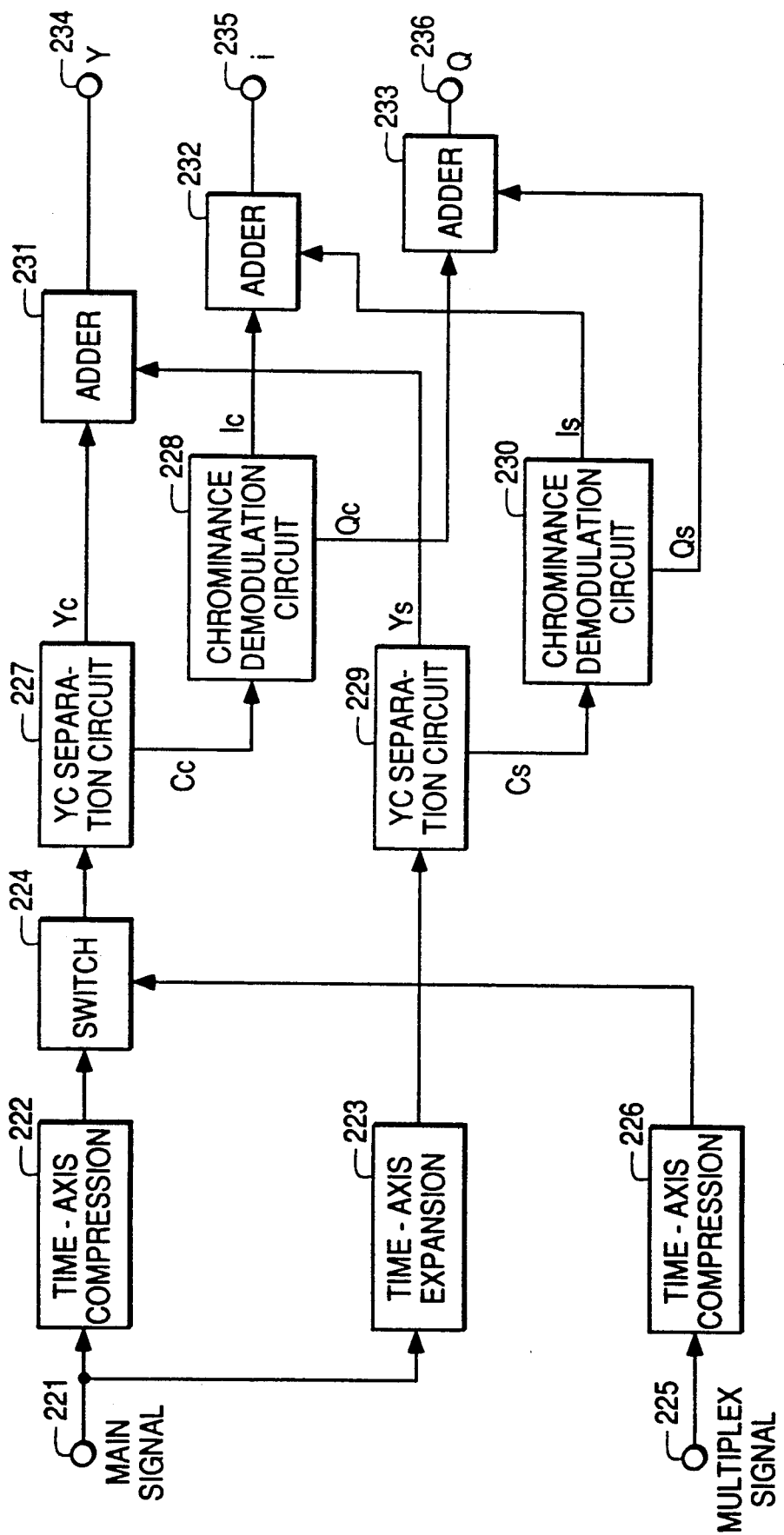

FIG. 8 is a block diagram showing one example of the signal processing circuit 111 of FIG. 4. Element 221 is a main signal input terminal; element 225 a multiplex signal input signal terminal; elements 227 and 229 are YC separation circuits; elements 228 and 230 are chrominance demodulation circuits; elements 222, and 226 are time-axis compression circuits element Is 223 a time-axis expansion circuit element 224 is a switched elements 231, 232 and 233 are adders; element 234 is a luminance signal Y output terminal; element 235 is a chrominance signal I output terminal, and element 236 is a chrominance signal Q output terminal.

Among the main signals from the main signals input terminal 221, signals time-axis expanded at the transmission side and corresponding to the picture tube face of the existing television receiver with an aspect ratio of 4 : 3 are time-axis compressed by the time-axis compressed at the transmission side are time-axis expanded by the time-axis expansion circuit 223.

The multiplexed signals from the multiplex signal input terminal are time-axis compressed by the time-axis compression circuit 226. In the time-axis compression circuits 222 and 226 and in the time-axis expansion circuit 223, time-axis processing and time-axis regulation are reversed with respect to the time-axis expansion and time-axis compression t the respective transmission sides, so that transmission and reception are combined together to keep a normal timing relationship. In the switch 224, the output of the time-axis compression circuit 222 will be inputted at the period corresponding to the picture tube face of the existing television receiver with an aspect ratio of 4 : 3, and the output of the time-axis compression circuit 226 will be inputted at the other period respectively into the YC separation circuit 227. In the YC separation circuit 227, separation into luminance signals Yc and chrominance signals Cc occurs. The chrominance signals Cc as being the output of the YC separation circuit 227 are demodulated by the chrominance demodulation circuit 2128 to Ic and Qc signals.

On the other hand, the outputs of the time-axis expansion circuit 223 are inputted into the YC separation circuit 229 wherein they will be separated into luminance signals Ys and chrominance signals Cs. The chrominance signals Cs are demodulated by the chrominance demodulation circuit 230 into Is and Qs signals. The luminance signals Yc are added to the luminance signals Ys by the adder 231 to form luminance signals Y. Similarly, the chrominance signals Ic are added to the chrominance signals Is by the adder 232 to form chrominance signals I. Similarly, the chrominance signals Qc are added to the chrominance signals Qs by the adder 233 to form chrominance signals Q.

If the chrominance signals are not in superposition on the time-axis multiplexed signals, the sue of the YC separation circuit 229, the chrominance demodulation circuit 230 and the adders 232 and 233 is unnecessary, and the output of the time-axis expansion circuit 223 may be inputted into the adder 231. The output of the chrominance demodulation circuit 228 will become chrominance signals I and Q.

This structure of circuit of the TV receiver may do only with a single system in the time-axis compression circuit for the multiplex signal, a time-axis expansion circuit, and a time-axis compression circuit for the main signal, which constitutes a necessary and minimum structure of the time-axis processing circuit.

Figure 9:
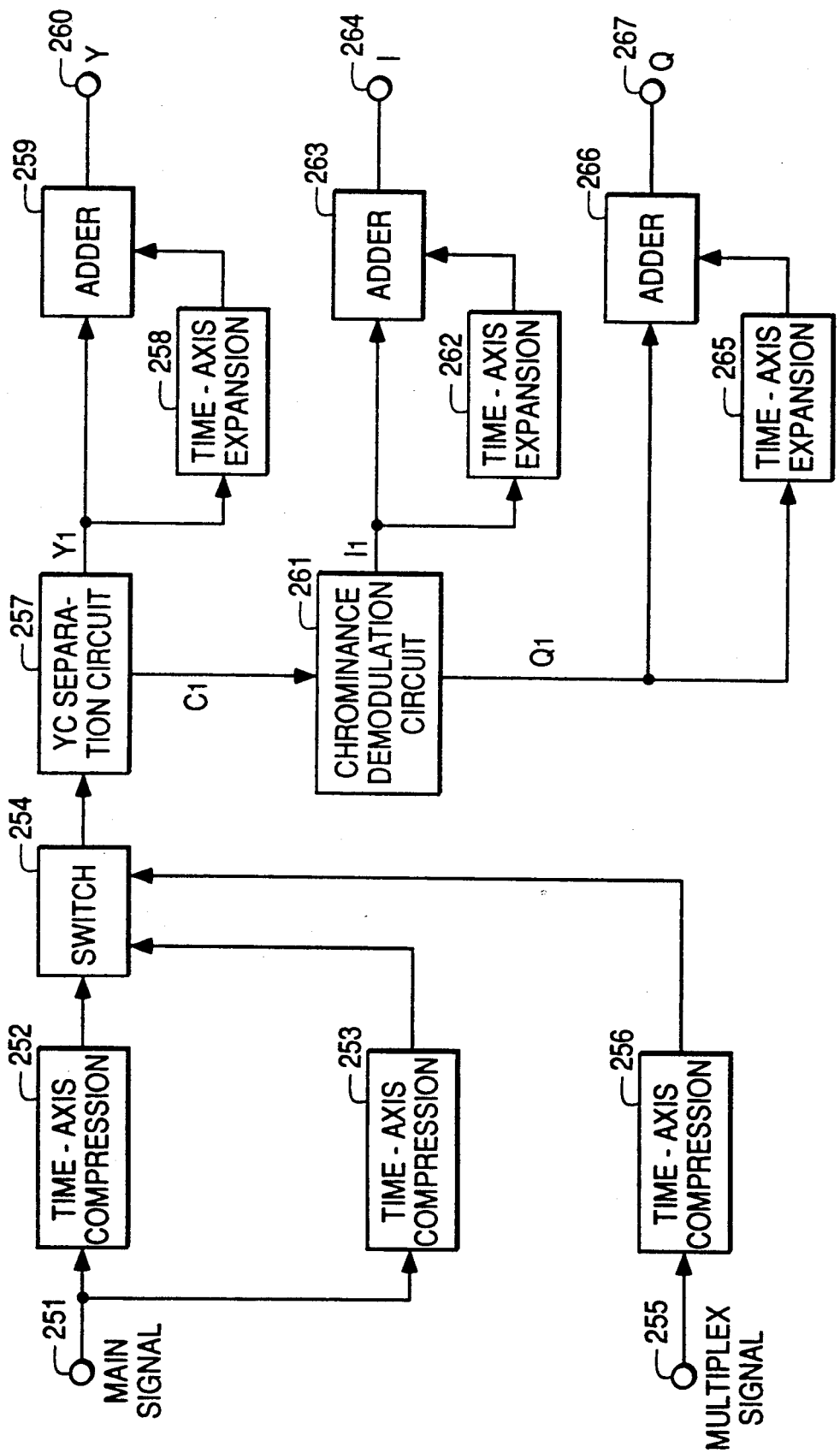

FIG. 9 is a block diagram showing one example of the internal structure of the signal processing circuit 111 of FIG. 4. Element 251 is a main signal input terminal; element 225 is a multiplex signal input terminal; element 257 is a YC separation circuit; element 261 is a chrominance demodulation circuit; elements 252, 253, and 256 are time-axis compression circuits elements 258, 262 and 265 are time-axis expansion circuits elements 254 is a switch. 259; elements 263 and 266 are adders; element 260 is a luminance signal y output terminal; element 264 is a chrominance signal I output terminal, and element 267 is a chrominance signal Q output terminal.

Among main signals from the main signal input terminal, signals time-axis expanded at the transmission side and corresponding to the portion of the picture tube face of the existing television receiver with an aspect ratio of 4 : 3 are time-axis compressed by the time-axis compression circuit 252. Other signals time-axis compressed at the transmission side are tie-axis compressed by the time-axis compression circuit 253, so that the time-axis adjustment will be made so as to allow the signals to appear within the blanking period.

Multiplex signals from the multiplex signal input terminal are time-axis compressed by the time-axis compression circuit 256. The switch 254 is operative to input into the YC separation circuit 257 the output of the time-axis compression circuit 252 at the period corresponding to the picture tube face of the existing television receiver with an aspect ratio of 4 : 3and to input the output of the time-axis compression circuit 256 at other image signal periods and the output of to input the time-axis compression circuit 253 during the blanking period. These inputted signals are separated by the YC separation circuit 257 into luminance signals Y1 and chrominance signals C1. The chrominance signals C1 output by the YC separation circuit 257 are demodulated by the chrominance demodulation circuit 162 to I1 signals and Q1 signals. Among the luminance signals Y1 output by the YC separation circuit 257, the ones corresponding to the signals which have been time-axis compressed by the time-axis compression circuit 253 are time-axis expanded by the time-axis expansion circuit 258 and time-axis adjusted so that a normal time relationship will be realized. The other luminance signals and the output of the time-axis expansion circuit 258 are added to one another by the adder 259 to form luminance signals Y.

Similarly, among the chrominance signals I1 output by the chrominance demodulation circuit 261, chrominance signals I corresponding to the signals time-axis compressed by the time-axis compression circuit 253 are time-axis expanded by the time-axis expansion circuit 262 and time-axis adjusted so that a normal time relationship will be realized. The other chrominance signals I are added to the output of the time-axis expansion circuit 262 by the adder 263 to form chrominance signals I.

Similarly, among chrominance signals Q1 output by the chrominance demodulation circuit 261, signals corresponding to the signals time-axis compressed by the time-axis compression circuit 253 are time-axis expanded by the time-axis expansion circuit 265 to effect time-axis adjustment for establishing a normal time relationship. The other chrominance signals Q are added to the output of the time-axis expansion circuit 265 by the adder 266 to form chrominance signals Q.

If the chrominance signals are not in superposition to the signals time-axis multiplexed, the time-axis expansion circuits 262 and 265, and the adder 263 and 266 are not necessary, and the outputs I1 and Q1 of the chrominance demodulation circuit 261 will become chrominance signals I and Q respectively.

Since the main signals and the multiplex signals are not processed separately by the YC separation circuits and the chrominance demodulation circuit, but by the same single circuit, this structure could be an effective structure of receiver.

Figure 10:
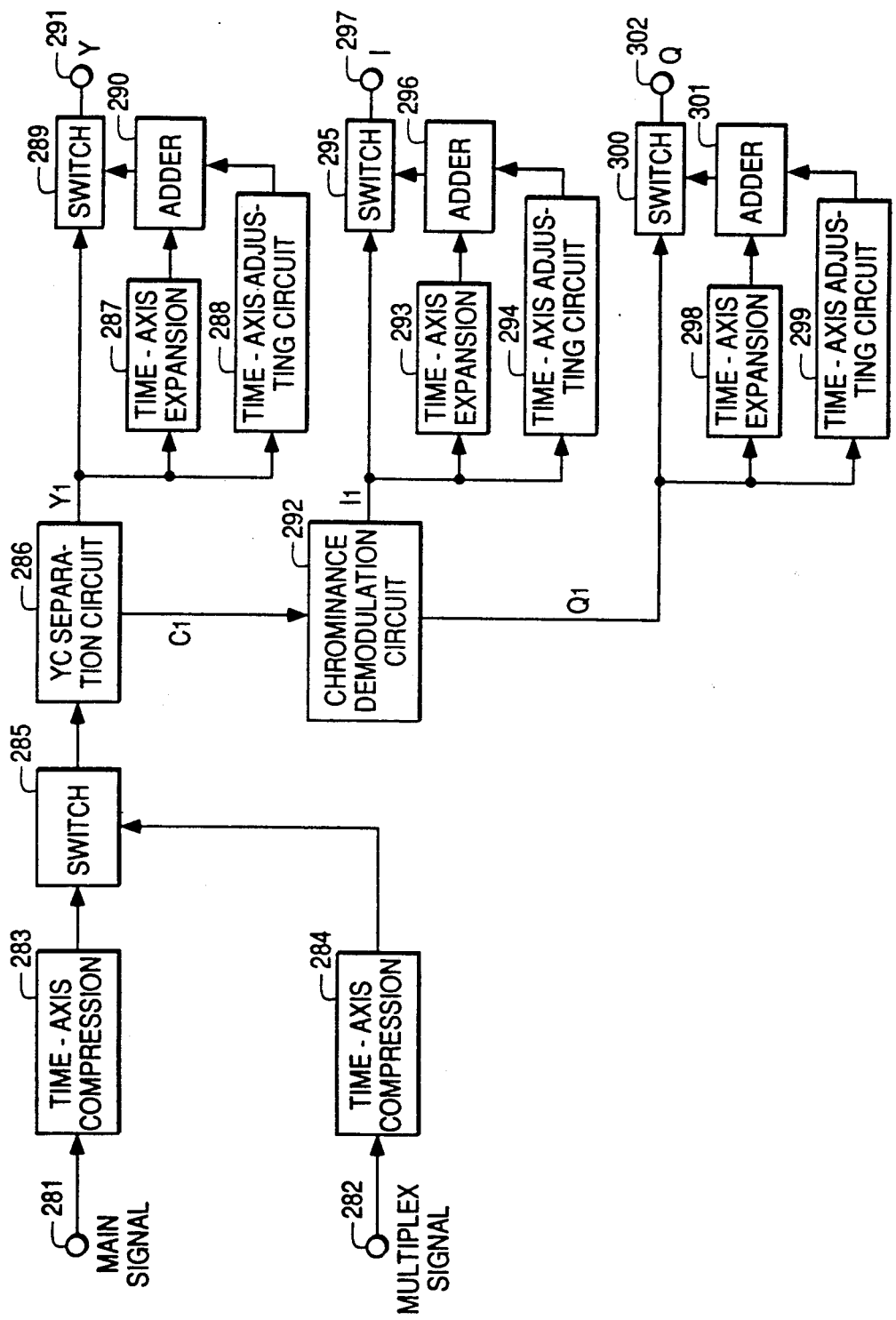

FIG. 10 is a block view showing one example of the signal processing circuit 111 of FIG. 4. Element 281 is a main signal input terminal, element 282 is a multiplex signal input terminal; element 286 is a YC separation circuit; element 292 is a chrominance demodulation circuit; elements 283, 284 are time-axis compression circuits elements 287 293, and 298 are time-axis expansion circuits; elements 288, 294 and 299 are time-axis adjustment circuits elements 285, 289, 295 and 300 are switches elements 290, 296 and 301 adders; element 291 is a luminance signal Y output terminal; element 297 is a chrominance signal I output terminal, and element 302 is a chrominance signal Q output terminal.

The main signals from the main signal input terminal 281 are time-axis compressed by the time-axis compression circuit 283. On the other hand, the multiplex signals from the multiplex signal input terminal are time-axis compressed by the time-axis compression circuit 284, performing a time-axis adjustment to avoid any superposition of the multiplex signals on the output signals of the time-axis compression circuit 283 on a timing basis. In the time-axis compression circuits 283 and 284, the time-axis process is carried out in a reverse manner with respect to the time-axis expansion at the transmission side respectively, provided further time-axis compression will be performed on the time-axis multiplexed signals. The switch 285 is operative to input into the YC separation circuit 286 the output of the time-axis compression circuit 283 at the period corresponding to the picture tube face of the existing television receiver with an aspect ratio of 4 : 3 as well as at the period in which the time-axis multiplex signals have been subjected to time-axis compression and will input the output of the time-axis compression circuit 284 during other periods. The YC separation circuit 286 acts to separate these signals into luminance signals Y1 and chrominance signals C1. The chrominance signals C1 output by the YC separation circuit 286 are demodulated by the chrominance demodulation circuit 292 into I1 and Q1 signals.

Among the luminance signals Y1 from the YC separation circuit 286, luminance signals corresponding to the time-axis multiplexed signals are time-axis expanded by the time-axis expansion circuit 287 to effect a time-axis adjustment for establishment of a normal time relationship. Additionally, the luminance signals corresponding to the multiplexed signals are time-axis adjusted by the time-axis adjustment circuit 288 for establishment of a normal time relationship. The addition of the output of the time-axis expansion circuit 287 and the output of the time-axis adjustment circuit 288 occurs in the adder 290. The switch 289 is operative to select the output of the YC separation circuit 286 at the period corresponding to the picture tube face of the existing television receiver with an aspect ratio of 4 : 3 and to select the output of the adder 290 during other periods. The output of the switch 289 will be luminance signals Y.

Similarly, among the chrominance signals I1 output by the chrominance demodulation circuit 292, chrominance signals I corresponding to the time-axis multiplexed signals are time-axis expanded by the time-axis expansion circuit 293 and then time-axis adjusted to establish a normal time relationship. Also, chrominance signals I corresponding to the multiplexed signals are time-axis adjusted by the time-axis adjustment circuit 294 to establish a normal time relationship. The addition of the outputs of the time-axis expansion circuit 293 and time-axis adjustment circuit 294 is performed by the adder 296. The switch 295 is operative to select the output of the chrominance demodulation circuit 292 at the period corresponding to the picture tube face of the existing television receiver with an aspect ratio of 4 : 3 and to select the output of the adder 296 during other periods. The output of the switch 295 will be chrominance signals I.

Similarly, among the chrominance signals Q1 output by the chrominance demodulation circuit 292, signals Q corresponding to the time-axis multiplexed signals are time-axis expanded by the time-axis expansion circuit 298 and then time-axis adjusted to establish a normal time relationship. In addition, signals Q corresponding to the multiplex signals are time-axis adjusted by the time-axis adjustment circuit 299 to establish a normal time relationship. The addition of the outputs of the time-axis expansion circuit 298 and time-axis adjustment circuit 299 is achieved by the adder 301. The switch 300 is operative to select the output of the chrominance demodulation circuit 292 at the period corresponding to the picture tube face of the existing television receiver with an aspect ratio of 4 : 3 and to select the output of the adder 301 during other periods. The output of the switch 300 will be chrominance signals Q.

With no superposition of the chrominance signals on the time-axis multiplexed signals, the time-axis expansion circuits 293 and 298 and the adders 296 and 301 are is no longer necessary, and the outputs of the time-axis adjustment circuits 294 and 299 may be inputted into the switches 295, and 300 respectively.

As described above, since the main signals and the multiplex signals are not processed separately by the YC separation circuit and chrominance demodulation circuit, but by the same single circuit, this structure could be an effective.

Figure 11:
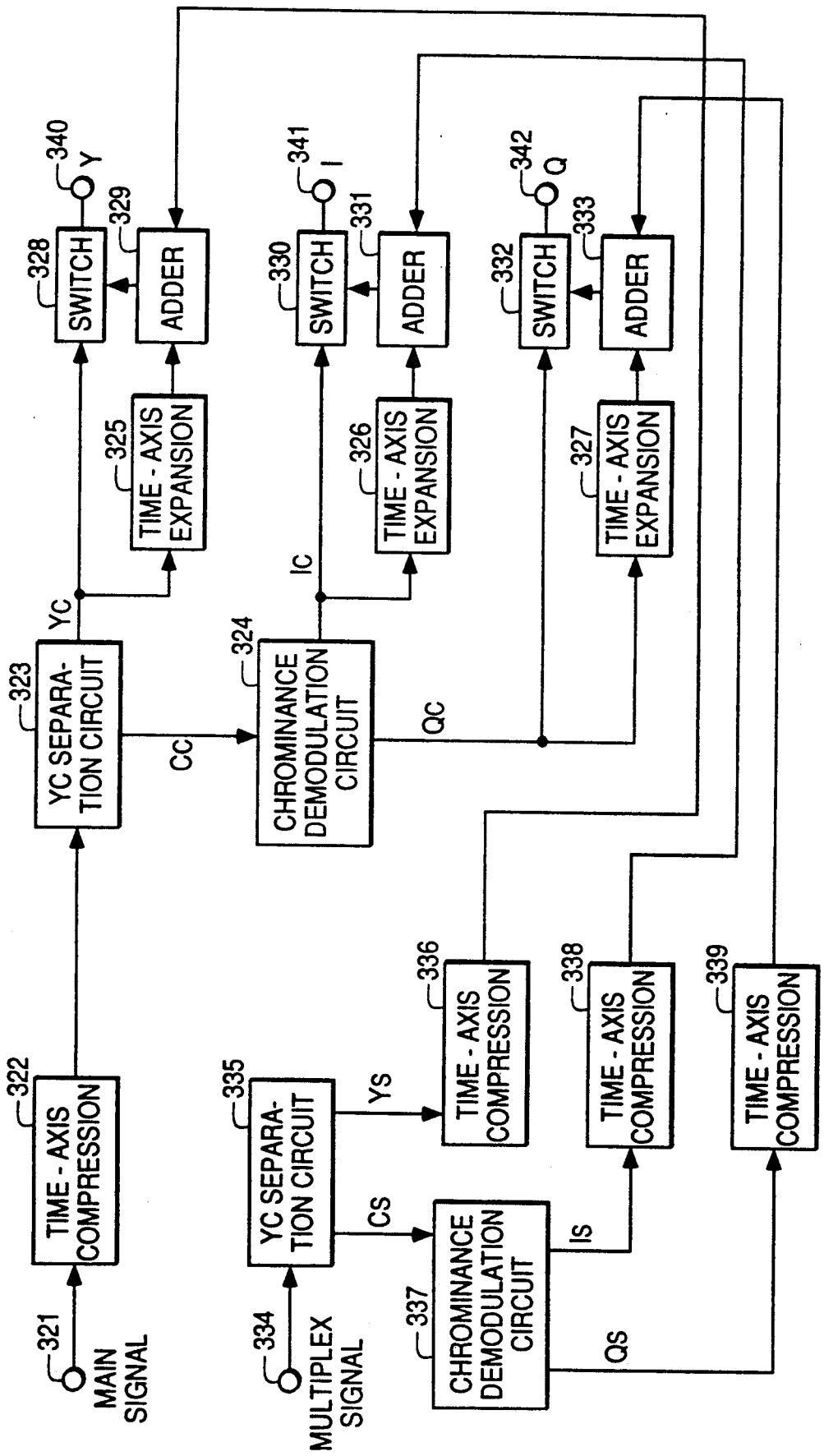

FIG. 11 is a block diagram showing one example of the internal configuration of the signal processing circuit 111 of FIG. 4. Element 321 is a main signal input terminal; element 334 is a multiplex signal terminal; element 323 and 335 are YC separation circuits elements 324 and 337 are chrominance demodulation circuits; elements 322, 336, 338, and 339 are time-axis compression circuits; elements 325, 326, and 327 are time-axis expansion circuits, 328, 330, and 332 switches, 329, 331, and 333 are adders; element 340 is a luminance signal Y output terminal; element 341 is a chrominance signal I output terminal, and 342 is a chrominance signal Q output terminal.

After main signals from the main signal input terminal are time-axis compressed by the time-axis compression circuit 322, the resultant signals are separated by the YC separation circuit 323 into luminance signals Yc and chrominance signals Cc. Some of the Yc signals output by the YC separation circuit 323 are time-axis compressed at the transmission side and then time-axis compressed again by the time-axis compression circuit 322 before they are expanded by the time-axis expansion circuit 325 to be received by the adder 329. The chrominance signals Cc output by the YC separation circuit 323 are demodulated by the chrominance demodulation circuit 324 into Ic and Qc signals. Similarly, the Ic and Qc signals are time-axis compressed at the transmission side, and then by the time-axis compression circuit 322 and then time-axis expanded by the time-axis expansion circuits 326 and 327 until they are inputted into the adders 331 and 333 respectively.

On the other hand, multiplex signals from the multiplex signal input terminal 334 are separated by the YC separation circuit 335 into luminance signals Ys and chrominance signals Cs. The chrominance signals Cs are demodulated by the chrominance demodulation circuit 337 into Is and Qs signals. The luminance signals Ys are time-axis compressed by the time-axis compression circuit 336, and then added to the output of the time-axis expansion circuit 325 by the adder 329 and finally inputted into the switch 328. The switch 328 is operative to output the output Yc of the YC separation circuit 323 at the period corresponding to the portion of the aspect ratio of 4 : 3 and to output the output of the adder 329 during other periods, both output signals being luminance signals Y.

Similarly, the Is signals are time-axis compressed by the time-axis compression circuit 338, added by the adder 331 to the output of the time-axis expansion circuit 326, and inputted into the switch 330. In the switch 330, the output Ic signals of the chrominance demodulation circuit 324 will be outputted at the period corresponding to the portion of the aspect ratio of 4 : 3 and the output of the adder 331 will be outputted during other periods respectively as chrominance signals I.

Similarly, the Qs signals are time-axis compressed by the time-axis compression circuit 339, added by the adder 333 to the output of the time-axis expansion circuit 327, and inputted into the switch 332. In the switch 332, the output Qc signals will be outputted at the period corresponding to the portion of the aspect ratio of 4 : 3 and the output of the adder 333 will be outputted during other periods respectively as chrominance signals Q.

With no superposition of the chrominance signals on the multiplex signals, time-axis expansion circuits 326 and 327 and the adders, 331 and 333 are is unnecessary, and the outputs of the time-axis compression circuits 338 and 339 may be inputted into the switches 330 and 332 respectively.

What is claimed is:

1. A television signal processing apparatus at the transmission side, comprising:

means for time-axis expanding and chrominance signal processing a first portion of an electric signal obtained by picking up an original image with as aspect ratio larger than the standard one, the first portion corresponding to the standard aspect ratio;

mean for separating a second portion corresponding to the remaining portion of the electric signal into a high frequency component and a low frequency component;

means for time-axis compressing and chrominance signal processing said low frequency component;

means for time-axis expanding and chrominance signal processing said high frequency component;

signal producing means for producing a main signal and a multiplex signal by time-axis multiplexing on a signal corresponding to said first portion and a signal corresponding to said low frequency component; and non-time-axis multiplexing means for non-time-axis multiplexing said main signal and said multiplex signal;

wherein the signal producing means comprises:

means for time-axis expanding said first portion after chrominance signal processing;

means for splitting said second portion into a high frequency component and a low frequency component;

means for switching said high frequency component to said first portion on the time-axis;

means for time-axis compressing said low frequency component after chrominance signal processing;

means for switching the output of said time-axis expansion means and the output of the time-axis compression means to obtain the main signal; and means for time-axis expanding the signals corresponding to said high frequency component to obtain the multiplex signal.

2. A television signal processing apparatus adapted to receive a non-time-axis multiplex signal composed of a main signal and a multiplex signal, the main signal being constituted by, among an electric signal obtained by picking up an original picture image with an aspect ratio larger then the standard one and consisting of a first portion corresponding to the standard aspect ratio and a second portion corresponding to the remainder of said electric signal, a low frequency component of the second portion and the first portion, and the multiplex signal being constituted by a high frequency component of the second portion, said apparatus comprising:

non-time-axis multiplex signal separating means for separating the non-time-axis multiplexed signal into the main signal and the multiplex signal; and signal processing means for time-axis compressing and chrominance signal processing a signal corresponding to the first portion of said main signal, tie-axis expanding a signal corresponding to the low frequency component of the second portion of said main signal, and time-axis compressing and chrominance signal processing said multiplex signal;

wherein the signal processing means comprises:

means for time-axis compressing said main signal, separating a chrominance signal from a luminance signal, and demodulating the chrominance signal;

means for time-axis expanding a signal corresponding to the low frequency component of the second portion of the output signal of said chrominance signal processing means; and means for separating said multiplex signal into a luminance signal and a chrominance signal, and time-axis compressing the separate signals.

3. A television signal processing apparatus at the reception side adapted to receive a non-time-axis multiplex signal composed of a main signal and a multiplex signal, the main signal being constituted by, among an electric signal obtained by picking up an original picture image with an aspect ratio larger than the standard one and consisting of a first portion corresponding to the standard aspect ratio and a second portion corresponding to the remainder of said electric signal, a low frequency component of the second portion and the first portion, and the multiplex signal being constituted by a high frequency component of the second portion, said apparatus comprising:

non-time-axis multiplex signal separating means for separating the non-time-axis multiplexed signal into the main signal and the multiplex signal; and signal processing means for time-axis compressing and chrominance signal processing a signal corresponding to the first portion of said main signal, time-axis expanding a signal corresponding to the low frequency component of the second portion of said main signal, and time-axis compressing said multiplex signal and switching it on the time-axis to said main signal.

4. An apparatus as defined in claim 3, wherein the signal processing means comprises:

chrominance signal processing means for separating said main signal into a luminance signal and a chrominance signal, and demodulating the chrominance signal;

means for time-axis compressing a signal corresponding to the first portion of the output signal of said chrominance signal processing means;

means for time-axis expanding a signal corresponding to the low frequency component of the second portion of the output signal of said chrominance signal processing means; and means for time-axis compressing said multiplex signals and switching it on the time-axis to said main signal.

5. An apparatus as defined in claim 3, wherein the signal processing means comprises:

first time-axis compression means for time-axis compressing said main signal;

second time-axis compression means for time-axis compressing said multiplex signal;

time-axis switching means for time-axis switching outputs of said first and second time-axis compression means;

chrominance signal processing means for separating an output of said time-axis switching means into luminance and chrominance signals, and demodulating the chrominance signal;

means for time-axis expanding a signal corresponding to the low frequency component of the second portion of the output signal of said chrominance signal processing means; and means for time-axis adjusting a signal corresponding to the multiplex signal of the output signal of said chrominance signal processing means.

6. A television signal processing apparatus adapted to receive a non-time-axis multiplex signal composed of a main signal and a multiplex signal, the main signal being constituted by, among an electric signal obtained by picking up an original picture image with an aspect ratio larger than the standard one and consisting of a first portion corresponding to the standard aspect ratio and a second portion corresponding to the remainder of said electric signal, a low frequency component of the second portion and the first position, and the multiplex signal being constituted by a high frequency component of the second portion, said apparatus comprising:

- non-time-axis multiplex signal separating means for separating the main signal and the multiplex signal from the non-time-axis multiplexed signal;
- first time-axis compression means for time-axis compressing a signal corresponding to the first portion of said main signal;
- time-axis expanding means for time-axis expanding a signal corresponding to the low frequency component of the second portion of said main signal;
- second time-axis compression means for time-axis compressing said multiplex signal;
- time-axis switching means for switching on the time-axis an output of the first time-axis compression means and an output of the second time-axis compression means;
- first chrominance signal processing means for separating a luminance signal and a chrominance signal from an output of said time-axis switching means, and demodulating the chrominance signal; and
- second chrominance signal processing means for separating a luminance signal and a chrominance signal from an output of said time-axis expansion means, and demodulating the chrominance signal.

7. A television signal processing apparatus adapted to receive a non-time-axis multiplex signal composed of a main signal and a multiplex signal, the main signal being constituted by, among an electric signal obtained by picking up an original picture image with an aspect ratio larger than the standard one and consisting of a first portion corresponding to the standard aspect ratio and a second portion corresponding to the remainder of said electric signal, a low frequency component of the second portion and the first portion, and the multiplex signal being constituted by a high frequency component of the second portion, said apparatus comprising:

- non-time-axis multiplex signal separation means for separating the main signal and the multiplex signal from the non-time-axis multiplexed signal;
- first time-axis compression means for time-axis compressing a signal corresponding to the first portion of said main signal;
- second time-axis compression means for time-axis compressing a signal corresponding to the low frequency component of the second portion of said main signal;
- third time-axis compression means for time-axis compressing said multiplex signal;
- time-axis switching means for switching on the time-axis outputs of said first, second and third time-axis compression means;
- chrominance signal processing means for separating a luminance signal and a chrominance signal from an output of said time-axis switching means, and demodulating the chrominance signal; and
- for time-axis expanding a signal corresponding to the low frequency component of the second portion of an output of said chrominance signal processing means.

8. An apparatus as defined in claim 3, 6 or 7, wherein the non-time-axis multiplex signal separation means comprises:

- filter means for eliminating quadrature distortion; and
- means for performing synchronous detection by using a carrier which is identical in frequency to and different in phase from a video carrier.

* * * * *